(12) United States Patent
Takai et al.

(10) Patent No.: US 8,449,935 B2
(45) Date of Patent: May 28, 2013

(54) PROCESS FOR PRODUCING SOY MILK

(75) Inventors: Toichiro Takai, Ishikawa (JP); Toru Awazu, Ishikawa (JP); Motonari Amano, Ishikawa (JP); Masahiro Yoshida, Ishikawa (JP); Masato Nishi, Ishikawa (JP)

(73) Assignee: Takai Tofu & Soymilk Equipment Co., Ishikawa-Gun, Ishikawa (JP)

( * ) Notice: Subject to any disclaimer, the term of this patent is extended or adjusted under 35 U.S.C. 154(b) by 581 days.

(21) Appl. No.: 12/448,424

(22) PCT Filed: Dec. 28, 2007

(86) PCT No.: PCT/JP2007/075330
§ 371 (c)(1),
(2), (4) Date: Jul. 16, 2009

(87) PCT Pub. No.: WO2008/081948
PCT Pub. Date: Jul. 10, 2008

(65) Prior Publication Data
US 2010/0086660 A1    Apr. 8, 2010

(30) Foreign Application Priority Data

Dec. 28, 2006 (JP) ................................ 2006-356456

(51) Int. Cl.
A23L 1/20 (2006.01)
(52) U.S. Cl.
USPC ............................ 426/507; 426/634; 426/522
(58) Field of Classification Search
CPC ....................................................... A23L 1/20
USPC ................. 426/489, 518, 519, 634, 495, 511, 426/507, 520
See application file for complete search history.

(56) References Cited

U.S. PATENT DOCUMENTS

| | | | | |
|---|---|---|---|---|
| 3,764,708 A | * | 10/1973 | Aonuma et al. | 426/46 |
| 4,409,256 A | * | 10/1983 | Johnson et al. | 426/598 |
| 4,902,526 A | * | 2/1990 | Sudo et al. | 426/598 |
| 5,863,590 A | * | 1/1999 | Alan et al. | 426/634 |

FOREIGN PATENT DOCUMENTS

| | | |
|---|---|---|
| JP | S52-154545 | 12/1977 |
| JP | S61-216652 | 9/1986 |
| JP | H02-049556 | 2/1990 |
| JP | 2002-095433 | 4/2002 |

* cited by examiner

Primary Examiner — Steven Leff
(74) Attorney, Agent, or Firm — Manabu Kanesaka

(57) ABSTRACT

It is to provide a process and apparatus for producing soymilk which is obtained by completely deactivating various kinds of enzymes responsible for a grassy smell, while preventing heating unevenness, and inducing appropriate thermal denaturation of protein and a rich flavor, and which can be processed by coagulation into tofu high in water retentivity and elasticity and rich in flavor. [Solving means] The apparatus includes a submerged friction-grinding unit M having a friction-grinding portion in which soybeans are friction-ground together with soybean-grinding water to obtain a raw soybean soup, a heating unit N for heating the raw soybean soup obtained in the submerged friction-grinding unit M, a connecting pipe P2 for connecting the submerged grinding unit M and the heating unit N and a preheating unit Y1 attached to the connecting pipe P2 for preheating the raw soybean soup, whereby the raw soybean soup obtained in the submerged friction-grinding unit M is fed into the heating unit N while being preheated and is then further heated in the heating unit N The heating step by the heating unit N may be divided into multiple stages.

13 Claims, 16 Drawing Sheets

PROCESS FOR PRODUCING SOY MILK

TECHNICAL FIELD

The present invention relates to a process for producing soymilk wherein ingredients contained in soybeans are suppressed from being changed due to the oxidative decomposition of lipids by oxidizing and degrading enzymes to enhance the flavor of the soymilk and the physical properties of the soymilk for producing tofu.

BACKGROUND ART

Tofu or soymilk is a traditional health food highly nutritious and made from soybeans. In recent years, tofu or soymilk that is a natural food has had received attention for health-conscious consumers. On the other hand, while soybean products have come under review as least favorite, traditional and healthy foods because of an unpleasant smell and an astringent taste peculiar to tofu or soymilk, soymilk suppressed in inherent unpleasant smell and astringent taste and having ever better quality has been expected.

The unpleasant smell peculiar to soybeans is represented by a grassy smell that is a rancid smell as being emitted from green grass and has a lot to do with the action (oxidation and degradation reactions) of lipoxygenase that is one of enzymes. The lipoxygenase reacts with unsaturated fatty acid contained in soybeans to produce lipid peroxide, and the lipid peroxide is further decomposed into medium-chain aldehyde and alcohols constituting an unpleasant smell (grassy smell). In order for the lipoxygenase to act, the presence of lipid constituting a substrate and oxygen is needed. According to academic document 1, lipoxygenase contains three kinds of isozymes L1, L2 and L3, of which L2 particularly affects the generation of a grassy smell, and the deactivation temperature of the isozyme is 60° C. at which the enzymatic activation is reduced by one half. In addition, β-glucosidase that is a glycolitic enzyme separates sugar of glycosides of saponin or isoflavonoid contained in soybeans to produce aglycone stronger in unpleasant taste and astringent taste. According to document 1, the deactivation temperature of β-glucosidase is 50° C. In addition, it has been known that the action of these enzymes is suppressed at 15° C. or less. That is to say, there have been known plenty of techniques for suppressing an unpleasant smell of soymilk or tofu, including a method of subjecting soybeans to pretreatment of high-temperature heating (Patent Document 4), an enzyme deactivation treating method that grinds down soybeans by friction in hot water (Patent Document 5), an alkaline-side adjustment treating method using a pH adjuster (Patent Documents 4, 9 and 10), a method of adding an enzyme-inhibiting agent (Patent Document 7), and a method of grinding down soybeans by friction in an anoxic or low-temperature environment (Patent Documents 3, 6 and 9). Though a method comprising adding hot water directly to soybeans to deactivate lipoxygenase has been reported, the method poses a problem of lowering the extractability of a soymilk solid content because proteins stored in the soybeans are immobilized. In addition, though it is effective that soybeans are heated to a predetermined temperature immediately after being ground down by friction, thereby deactivating the oxidizing and degrading enzymes (Patent Document 2), this method is of ill report because it entails failure to coagulate tofu even by the addition of a coagulant or mere production of tofu that is soft even when being coagulated or flavorless and bland.

As another method, there is a method of using in some locations soybeans lacking the gene for lipoxygenaze as raw materials. However, since the soybeans that lack the gene for lipoxygenaze are more expensive by 30 to 40% than ordinary soybeans, the method entails the problem resulting in an increase in cost to a great extent.

Under these circumstances, an improvement in an apparatus for producing soymilk, in which soybeans are ground down by friction in a low-oxygen atmosphere to obtain a raw soybean soup which is then immediately heated to a predetermined temperature, has been in progress. Disclosed in Patent Document 1 is a method for producing smell-less soymilk that comprises grinding down soaked soybeans by friction in an anoxic atmosphere to obtain a raw soybean soup, then transferring the raw soybean soup to an instantaneous continuous heating unit in a state of noncontact with air and continuously heating the raw soybean soup under conditions of a temperature of around 80° C. or more and a period of around one sec or more, with the instantaneous continuous heating unit filled with the raw soybean soup. Furthermore, in Patent Document 2, an apparatus for continuously grinding down food grains by friction and a method for producing soymilk comprising grinding down soybeans by friction in water to obtain a raw soybean soup, subsequently feeding the raw soybean soup from a connecting pipe connected to a friction-grinding portion to a transferring pipe with a transfer pump and heating the raw soybean soup to a predetermined temperature in a heating unit are disclosed.

Patent Document 1: JP-A SHO 52-154545
    Patent Document 2: JP-A 2005-304474
    Patent Document 3: JP-A SHO 52-154545
    Patent Document 4: JP-A SHO 52-125667
    Patent Document 5: JP-A SHO 53-047553
    Patent Document 6: JP-A SHO 62-502864
    Patent Document 7: JP-A SHO 51-029280
    Patent Document 8: JP-A SHO 64-086851
    Patent Document 9: JP-B SHO 56-050818
    Patent Document 10: JP-A SHO 53-091161
    Patent Document 11: JP-A HEI 05-184293
    Patent Document 12: JP-A SHO 53-066465
    Patent Document 13: JP-A 2006-015206
    Non-Patent Document 1: Food Science and Technology Research, Vol. 36, No. 4, pp. 318-324 (1989)
    Non-Patent Document 2: Food Science and Technology Research, Vol. 36, No. 8, pp. 658-663 (1989)
    Non-Patent Document 3: Report of the Soy Protein Research Committee, Vol. 15, pp. 36-40 (1994)

DISCLOSURE OF THE INVENTION

Problems the Invention Intends to Solve

In the apparatus of conventional Patent Documents 1 and 2, however, it is suggested that a heating unit is used to heat a raw soybean soup to 80° C. or more at a burst for a short period of time so as not to allow lipoxygenase to fulfill its function. While such rapid heating of the raw soybean soup can deactivate lipid-oxidizing enzymes to suppress a grassy smell in flavor of soymilk and make the soymilk taste light, it induces a burnt smell due to heating unevenness (temperature variation) and makes the soymilk easy to foam and excessively highly viscous. When the soymilk has been coagulated into tofu, the tofu has an excessively refreshing aftertaste and is low in water retentivity and insufficient in elasticity. Sometimes the tofu becomes unevenly gelled and, when having been filled in a pack, is easy to adhere to the pack and, when having been processed into cotton tofu, is easy to adhere to the cotton cloth. Thus, problems are entailed in induction of substandard tofu and tofu loss and in making the tofu not good enough from the standpoints of eating texture and flavor, resulting in getting a correspondingly bad reputation. That is to say, though the soymilk suffices without modification merely for drinking, it is difficult to produce as soymilk for tofu of quality rich in flavor and good in eating texture.

On the other hand, in order to give a product a rich flavor, adjustment of boiling time in a heating unit is absolutely necessary. However, adjustment in balance between the pre-step and the post-step is needed depending on rapid or slow heating. In addition, there is a case where the flow rate of a raw soybean soup is not always constant because a change in load on a friction-grinding unit is induced by disturbance, such as the size and hardness of soybeans, fluctuation in voltage, etc. The influence thereof, in a system connected in a completely sealed system, brings itself to fluctuation in heating and fluctuation in quality of soymilk and tofu.

The object of the present invention, therefore, is to provide a stable process and apparatus for producing soymilk which is obtained by completely deactivating various kinds of enzymes responsible for a grassy smell, while preventing heating unevenness, and inducing appropriate thermal denaturation of protein and a rich flavor, and which can be processed by coagulation into tofu of quality high in water retentivity and good in both eating texture and flavor and in which a system capable of absorbing a load change is used to enhance production efficiency.

Means for Solving the Problems

The soymilk-producing process according to the present invention comprises a submerged friction-grinding step of grinding down soybeans by friction in soybean-grinding water at a friction-grinding portion of a submerged friction-grinding unit to obtain a raw soybean soup, a preheating step of preheating the soybean soup thus obtained and a heating step of further heating the soybean soup preheated in the preheating step, wherein the soybean soup obtained in the submerged friction-grinding step is fed to the heating step while being preheated and is further heated in the heating step.

In the soymilk-producing method according to the present invention, since soybeans and soybean-grinding water are first subjected to submerged friction-grinding at the friction-grinding portion using the friction-grinding unit to produce a raw soybean soup, the soybeans are friction-ground in water having a low oxygen concentration to bring the raw soybean soup to a state in which a reaction of oxidizing the ingredients of the soup by lipoxygenase is suppressed. Since the raw soybean soup is thereafter kept in an airtight state or at 15° C. or less, the action of the oxidizing and degrading enzymes, such as lipoxygenase, can be suppressed (Table 4). Otherwise, even when the raw soybean soup is temporarily stored in an open balance tank to be brought to a semi-airtight state, if it is kept left at rest without being vigorously stirred and promoting contact with air, an oxidation reaction is only made in the vicinity of the surface thereof. In addition, if it is kept in a temperature environment (15° C. or less) difficult for various kinds of enzymes to function or for a period of around 5 min, there are few affects of a grassy smell due to the oxidation reaction. There is no problem if the raw soybean soup has a flavor commercially allowable. If it rather has a slightly grassy smell, there is a case where it is given a high evaluation because it has a flavor like tofu. In addition, by providing an aging time so that other degrading enzymes may slightly operate while suppressing the oxidation reaction under the airtight condition, it is possible to enhance the physiological activity by isoflavon. Furthermore, by causing oxidase to slightly act, oxidation of proteins (induction of S—S bonds) is induced to enhance the properties of soymilk and tofu. The balance tank is provided in a series of steps for the purpose of adjusting the balance between the ability or load change in the submerged friction-grinding step that is the pre-step and the ability of the preheating step that is the post-step. Particularly, to the case where the post-step is the step of using a batchwise heating unit (disposing two or more boiling cans) and the processing ability is to be enhanced, the balance tank is indispensable. Incidentally, it is more effective that the balance tank is provided with a simple lid or a mouth for internal and external air to bring the tank to a semi-airtight state, or means for blowing inert gas (nitrogen gas or carbon dioxide gas) therein to keep the tank under an oxygen-free or low-oxygen condition.

Next, the soybean soup obtained through the submerged friction grinding is fed to the preheating unit provided on the connecting pipe and rapidly preheated by the preheating unit, thereby enabling deactivation of, or reducing by half the activity of, oxidizing and degrading enzymes, such as lipoxygenase, polyphenol oxydase or peroxide lyase, or carbohydrate hydrolytic enzymes, such as $\beta$-glucosidase. In the preheating unit, heating by steam supplied to the connecting pipe allows the steam to be scattered in the soybean soup, thereby enabling prevention of heating unevenness even in the case of rapid high-temperature heating. In addition, by disposing on the connecting pipe between the preheating unit and the heating unit a stirring and mixing unit for stirring and mixing the soybean soup to homogenize the soybean soup, it is possible to suppress separation of the soybean soup and further prevent the heating unevenness.

As the preheating unit, a steam ejector, steam injection unit or steam infusion unit for supplying steam to the connecting pipe to continuously heat the soybean soup is preferably used. However, a batchwise unit may be used. These units jet a high-temperature high-pressure steam from a nozzle to enable continuous and direct heating of the soybean soup. Furthermore, the steam ejector or steam injection unit has a function to feed the soybean soup up to the heating unit and can be used concurrently as transfer means or transfer assistant means. In the case of the steam infusion unit, separate transfer means, such as a pump, is used.

By immediately feeding the soybean soup preheated with the preheating unit to the heating unit and heating the fed soybean soup with the heating unit, various kinds of enzymes are completely deactivated while preventing heating unevenness. Further by inducing appropriate thermal denaturation of proteins and appropriate flavor, when the soymilk obtained has been coagulated, it is possible to produce tofu of quality having high water retentivity and possessing a pleasing flavor. By preheating the soybean soup at 60° C. to 80° C. with the preheating unit and heating the resultant soybean soup at the same temperature as or a higher temperature than the preheating temperature with the heating unit, it is possible to produce tofu with a sweet taste and a clear aftertaste. The preheating time period is 60 sec or less, preferably a short period of time of 10 sec or less, and the temperature elevating velocity is 5 to 500° C./sec, preferably 50 to 200° C. at which rapid (or instantaneous) heating is performed. In addition, the soybean soup preheated may be retained at the final preheating temperature for 1 to 3600 sec, preferably 0.1 to 10 min, for example. In addition, a cooling unit (or cooling step) may be provided immediately after the preheating unit (preheating step) to once cool (or chill) the soybean soup to a temperature of 79° C. or less, preferably of 0 to 75° C. As a result, an intermittent sterilizing effect and a thermal denaturation effect of soybean proteins can also be enhanced. In the heating unit (heating step), by setting the heating time (i.e. temperature elevating time or retention time at a constant temperature) to be 1 sec to 30 min, preferably 10 sec to 15 min, more preferably 20 sec to 10 min, it is possible to sufficiently proceed with the thermal denaturation of soybean proteins and adjust the coagulability of soymilk and the water retentivity and elasticity of tofu to the optimum. Particularly, in the heating unit (heating step), heating may optionally combine a temperature elevating velocity of 30° C./min, preferably 5 to 15° C./min that is a slow velocity, at 70° C. or more that is the heat denaturation temperature of soybean proteins, preferably at 75 to 110° C., with a retention time for 5 sec to 10 min, preferably 15 sec to 5 min. As a result, the effect of inducing sweet and fragrant aroma ingredients by heating can be expected. In the heating unit (or heating step), an ultrahigh temperature (UHT) flash pasteurization unit (ultrahigh temperature (UHT) flash pasteurization step) combining rapid heating with rapid cooling and generally used for milk beverages may be used adopting a temperature of 110° C. to 180° C. preferably for a heating retention period of time 0.1 to 600 sec (5 sec at 140° C., 0.5 sec at 180° C., for example).

The temperature of the soybean soup thus preheated is then retained at 60° C. or more, preferably 70° C. or more, to enable the action of the oxidizing and degrading enzymes, such as lipoxygenase, that have not yet completely deactivated to be suppressed. Otherwise, even in the case where the soybean soup is temporarily stored in an open balance tank or a batchwise boiling can to bring the soybean soup to a semi-airtight state, if the temperature of the soybean soup is kept at 60° C. or more, preferably 70° C. or more, or if the soybean soup is kept left substantially at rest without being vigorously stirred and promoting contact with air, an oxidation reaction is only made slightly in the vicinity of the surface thereof. In addition, if the soybean soup is kept in a temperature environment (15° C. or less) difficult for various kinds of enzymes to function or for a period of around several minutes, there are few affects of a grassy smell due to the oxidation reaction. There is no problem if the soybean soup has a flavor commercially allowable. Adopting the batchwise boiling can as the heating unit is very advantageous for the case where a slow heating step is taken particularly for the purpose of enhancing the flavor of soymilk or the solid state properties of tofu or for the case where it is necessary to switch heating conditions so as to cope with production of various kinds of products. Conversely, it is advantageous to fabricate a continuous system with respect all steps and units items in a line of mass-producing a single kind of products. The balance tank disposed behind the preheating step is provided in a series of steps including a batchwise boiling can for the purpose of adjusting the balance between the ability or load fluctuation at the submerged friction-grinding step that is a pre-step and the ability of the heating step that is a post-step. Particularly, the balance tank is indispensable to the case where the post-step uses a batchwise heating unit (step of disposing a double-, triple- or quadruple-unit pattern necessitating two or more boiling cans to be disposed, for example) to enhance the treatment capacity. Incidentally, it is further effective that the balance tank is provided with a simple lid or a mouth for internal and external air to bring the tank to a semi-airtight state, or means for blowing inert gas (nitrogen gas or carbon dioxide gas) or steam therein to keep the tank under an oxygen-free or low-oxygen condition.

In the heating unit, contact between a raw soybean soup and air can be suppressed through filling the unit pattern with high-temperature steam by steam-generating means and continuing supply of the high-temperature steam. That is to say, it is preferred that the soybean soup transferred via the connecting pipe is heated under a low-oxygen condition under which the air in the heating unit has been expelled beforehand by the steam-generating means and the heating unit has been filled with high-temperature steam. According to the present invention, therefore, the soybean soup can smoothly be treated using a series of operations while suppressing quality alteration of the soybean ingredients in a substantially hermetically-sealed state, with contact between the raw soybean soup and air avoided as much as possible. Incidentally, it is desirable that the connecting pipe is provided thereon with a pressure adjustment portion, by means of which fluctuation in micro-pressure or flow rate due to the discharge pressure of the submerged friction-grinding unit or the coarseness of the soybean soup can be absorbed and, at the same time, stable preheating can be performed to make a prolonged-time operation ready to make. The pressure adjustment portion uses a check valve, pressure-regulating valve, back pressure valve, ball valve, butterfly valve or the like and is not particularly limited in structure or mechanism including that using a spring system, air pressure control system or pneumatic control system. In addition, it may use a pump (rotary pump, gear pump, MEMO pump, etc) concurrently provided with a transfer function solely or in combination. The position of the pressure adjustment portion to be installed may be before or immediately behind the transfer pump, or before or immediately behind the preheating unit, and is not particularly limited insofar as it is on the connecting pipe.

It is desirable that the preheating unit or heating unit is a heating unit using high-temperature steam as a heating medium. That is to say, the unit is a continuous steam ejector, steam injection unit or steam infusion unit for heating the soybean soup with steam supplied into the connecting pipe. Otherwise, it may be a hot water injecting unit for injecting high-pressure high-temperature hot water. The hot water injecting unit operates very calmly without producing any steam condensation sound and exhibits a working environment enhancing effect and a noise preventing effect in the neighborhood of a factory.

On the other hand, in the present invention, the preheating means (unit) and heating means (unit) may have either a respectively separated structure or an airtightly connected structure. Generally, in the case of configuring the airtight structure, a slightly complicated control means for automatically adjusting the balance between the pre-step and the post-step is provided to enable realization of a stable operation. In this case, however, it is necessary to prepare parts for a watertight or sealed structure, resulting in slightly high equipment cost. However, providing a balance tank midway enables configuration of an inexpensive unit and possibly brings about an economical result. The separated structure rather enables a stable operation and possibly makes the product quality stable. In addition, another structure may be adopted, in which the preheating step (unit) is omitted and the soybean soup after subjected to the submerged friction-grinding step may be connected directly to the heating step (unit) and, when necessary, via pressure adjustment means or a balance tank. That is to say, how to cook the soybean soup may start from rapid heating with a batch unit pattern to slow cooking completion of the soybean soup for a constant period of time after momentary temperature elevation up to 80 to 90° C.

The submerged friction-grinding step is adopted in the methods and apparatus which are disclosed in Patent Documents 3, 6 and 11 to 13, for example, and which are not particularly limited insofar as these have a mechanism capable of stably friction-grinding soybeans together with soybean-grinding water below water. Preferably, the soybean-grinding water has a temperature of 15° C. or less and soaked soybeans having whole soybeans soaked in water are optimally used. However, processed soybeans, such as dehulled soybeans, may be used. The soybean soup (also called raw soybean soup) obtained at the submerged friction-grinding step preferably has a specific gravity of 1 or more and a temperature of 15° C. or less. Though the submerged friction-grinding step and heating step are preferably continuous steps, either one or both of the steps may be batchwise step or steps. Incidentally, the temperature range of 15° C. or less at which the soybean grinding water and raw soybean soup are preferably retained after being subjected to submerged friction grinding step falls in a preferable time zone in which the raw soybean soup is retained during or after the friction-grinding step.

In the present invention, the submerged friction-grinding step is a step of grinding soybeans by friction below water and has an airtight configuration having quantifying machines back and forth and preferably has an airtight mechanism and structure. The heating step is a continuous step and preferably has a configuration in which a transferring pipe provided with plural heaters connected in series is water-sealed at the front and the back thereof. In addition, in the batchwise step, the air in a tank is substituted with steam or inert gas, such as nitrogen, to suppress the soybean soup from contacting air having a thick oxygen concentration, thereby enabling preventing to a great extent a grassy smell of the soybean soup from being generated. During the heating, it is effective to continuously blow all the time steam or inert gas, such as nitrogen, against air in the space above the soybean soup, thereby expelling the air from an exhaust port. Though the above state is not a completely anoxic state, slight generation of a grassy smell of the soybean soup is not so influential from a commercial point of view, and such soybean soup is rather effective for producing soymilk for tofu. Generally, in an ordinary manufacturing factory, since a soybean soup is batch-continuously used, the interior of a boiling unit pattern is always kept in a high-temperature state and in an environment filled with steam and having a much diluted oxygen concentration, resulting in self-evident effectiveness. In addition, the tank is structurally a pressure container or preferably has a configuration capable of closing a valve or an automatic valve to tightly close the container. Furthermore, it is desirable to adopt a system functionally capable of selecting open-state cooking and closed-state cooking.

In addition, the present invention is characterized by a retaining step St provided between the submerged friction-grinding step and the heating step (FIGS. 10(a), 10(b), 13(b) and 13(c)). In the retaining step, the soybean soup obtained at the submerged friction-grinding step is in readiness for a prescribed period of time or is retained in a prescribed amount. Commercially, there is no hindrance without deteriorating the object and effects of the present invention if the temperature of the soybean soup being retained is 15° C. or less and if the retaining time is up to 30 min. It is desirable that the retaining step provided is allowed to function as a balance tank for achieving a balance in capacity between the submerged friction-grinding step and the heating step to suppress fine fluctuation between the pre-step and the post-step and, when the post-step is a batchwise step, enhance the capacity thereof. The retaining step may be taken in series or in parallel relative to the submerged friction-grinding step and the heating step. While use of a retaining plumbing pipe kept airtightly is preferred, an open tank having a simple lid, a vent hole and an opening may be used.

The present invention is characterized in that the heating step is a batchwise heating step. The batchwise heating step uses a boiling can (batch unit pattern) that has heretofore been used for producing tofu, for example. It is preferred to use a system provided with at least two types of valves for steam supply capable of setting different steam flow rates and different steam pressures and with an automatic valve opened or closed with a signal of a controller, such as an indication adjuster. It is optimum that the heating step comprises a heating system controllable with a microcomputer.

The present invention is characterized in that the soybean soup is brought into contact with air in at least one of the submerged friction-grinding step, heating steps and connecting steps between the adjacent steps. At the retaining step or in the batch unit pattern, for example, the soybean soup is brought into contact with air. Otherwise, a method of positively injecting air (compressed air etc.) in a constant amount may be adopted. A prescribed amount of air is injected at any of the submerged friction-grinding step, heating steps and connecting steps (connecting pipes etc.) between the adjacent steps, or the soybean soup is exposed to air for a prescribed period of time.

The present invention is characterized in that the soybean soup is heated to or retained at a temperature in the range of 15 to 50° C. for a prescribed period of time while maintaining an airtight state that suppresses contact between the soybean soup and air at the preheating step. The present invention provides a method capable of suppressing the activity of oxidizing enzymes in the soybean soup and activating other degrading enzymes (glucosidase, esterase, for example) while preventing the soybean soup obtained at the submerged friction-grinding step kept at the temperature in the range of 15 to 50° C. from coming into contact with air. As a result, sugar of glycosides of phenols (isoflavone, saponin), for example, is removed to produce aglycone and enable enhancement of the physiological property. In addition, by rapidly elevating the temperature in the range of 15 to 50° C. by heat, it is possible to deactivate the glucosidase instantaneously and suppress production of a bitter taste due to the production of aglycone. While the lipoxygenase activity can be reduced to around one half at 50° C., the activity thereof can be suppressed during the retention of the low-oxygen environment.

The present invention is characterized in that the soybean soup is heated to or retained at a temperature in the range of 50 to 70° C. for a prescribed period of time while controlling contact between the soybean soup and air at the preheating step. In the present invention, though the temperature particularly in the range of 50 to 70° C. reduces the activity of the oxidizing enzymes to one half, it is still in the range of temperatures at which an oxidation action is slowly taken, thereby appropriately promoting a contact the soybean soup and air, making it easy to control the adjustment of an airtight state and inducing production of a flavor like that of tofu or oxidization of proteins (i.e. formation of S—S covalent bonds) to bring about the effect of producing tofu having a pronounced eating texture. When the soybean soup has a temperature in the range of 50 to 70° C., means for heating through supply of steam (or oxygen) having air sucked therein or means for flowing clean air (or oxygen) into the upper space in a batch unit pattern to always keep a high-concentration oxygen state is effective auxiliary means. Furthermore, it is also effective to stir the soybean soup strongly and vigorously in the batch unit pattern.

The present invention is characterized in that the soybean soup is heated to or retained at a temperature in the range of 70 to 100° C. for a prescribed period of time at the heating step that is preferably taken in a state particularly exposed to the atmosphere. In the present invention, since the temperature in the range of 70 to 100° C. is a temperature at which oxidase is deactivated, the soybean soup and air are placed in positively promoted contact with each other (subjected to aeration or exposed to the oxidizing condition, for example) to enable thermal denaturation to progress without generating a grassy smell while chemically inducing the oxidation reaction of proteins. In addition, in the formation of a flavor of soymilk and tofu, sweet flavor ingredients (maltol deriving from DDMP saponin (academic document 3) etc.) are produced and it is possible to make an adjustment to an appropriate flavor through partial flying-apart of volatile components like steam distillation in an open state. This is an important step from the standpoint of production of a flavor like that of tofu and thermal denaturation of proteins though it may be controlled to daringly make an adjustment to an airtight state. The heating time and retaining time to some extent in the aforementioned temperature range are adopted to obtain effects of inducing oxidation of proteins and producing tofu having pronounced and rich aroma. Incidentally, semi-raw soymilk having bean curd refuse separated at a separating step provided after the preheating step and before the main heating step may be heated to or retained at the temperature in the range of 70 to 100° C. for a prescribed period of time similarly at the heating step. In this case, exposure to the atmosphere is particularly preferred. The separating step is provided preferably with a submerged extracting mechanism (FIGS. 13(e) and 13(d)).

The present invention is characterized in that the soybean soup is heated to or retained at a temperature in the range of 100 to 180° C. for a prescribed period of time in a sealed state at the heating step. In the present invention, heating and retention of the soybean soup particularly at a temperature of 100 to 120° C. in the temperature range of 100 to 180° C. for a period of 1 to 600 sec induces thermal denaturation of proteins and can mainly add a flavor component, such as a spicy flavor (sulfurous smell deriving from protein SH groups or flavor of boiled eggs, for example). In addition, a high-temperature short-lasting heat treatment at a temperature of 120 to 180° C. particularly for a period of around 0.1 to 60 sec enables heat-resistant spores of sporular bacteria to be killed. It is desirable that, as a subsequent step, a step of indirect heat exchange or step of accelerated chilling by flashing is provided. Also, in the present invention, as a matter of course, a pressure-existing condition and an airtight state are preferred. In the neighborhood of 100° C., however, an open state may be adopted and, in the case of a batch unit pattern, the air in the upper space thereof is substituted in advance with high-temperature steam to bring the soybean soup to a low-oxygen state filled with steam. As a result, the soybean soup has little influence thereon. Incidentally, it may be adopted to provide a separating step after the preheating stem and heat semi-raw soymilk to or retain the same at a temperature in the range of 100 to 180° C. for a prescribed period of time in a sealed state similarly at the heating step. The separating step is desirably provided with a submerged extracting mechanism (FIGS. 13(e) and 13(d)).

The present invention is characterized in that the heating time or retaining time at the preheating step or heating step is in the range of 1 sec to 3600 sec. The total of the heating time (temperature elevation time) in the temperature zone at the preheating step or heating step in the present invention and the retaining time at the achieving temperature is in the range of 1 sec to 3600 sec to control the action of oxidase, the thermal denaturation of proteins, the production of volatile aroma components and the effect of sterilization. Since the enzymatic activity in soybeans possibly remains still in the case of an excessively rapid heating or short-lasting heating, it is important to set a retaining time adopted at a prescribed temperature.

The present invention is characterized by processes for producing soymilk which are set forth in claims 1 to 10 and the feature of which is inclusion of a rapid heating step taken at an average temperature-elevating rate of 0.2 to 100° C. per sec at the preheating step. In the present invention, by performing rapid heating including the rapid heating step taken at the average temperature-elevating rate of 0.2 to 100° C. per sec and performing heating to a prescribed temperature, it is possible to suppress as much as possible the action of the oxidase or degrading enzyme and excessive thermal denaturation of proteins. Inversely, relatively slow heating can promote the action and effect thereof. The significant point to consider the rapid heating is that excessively rapid temperature elevation induces heating unevenness and damages proteins to deteriorate coagulability.

The present invention is characterized in that an oxidant-supplying step for adding an oxidant by injection is provided between the submerged friction-grinding step and the heating step. In the present invention, an oxidant for articles of food is allowed to act on a soybean soup having the activity of oxidase reduced to one half or deactivated and controlled in amount thereof to be added, thereby adjusting a state of protein oxidation (i.e. formation of S—S covalent bonds) and reducing the viscosity of soymilk within the range of flavors having no real difficulties from a commercial point of view to enable production of tofu having hardness and a pronounced eating texture. In addition, the effect of decoloring a yellow pigment depending on the degree of adjustment to produce rich white soymilk and tofu can be expected. It is noted that the retaining step also includes a step of merely exposing the soybean soup to air. Particularly in the case of a raw soybean soup, the quality is easier to control at a temperature of less than 15° C. at which the oxidase activity is reduced one half or of 50° C. or more and less than 70° C. than at a temperature (in the range of 15° C. to 50° C.) at which the oxidase activity is high. Also at 70° C. or more, particularly 80° C. or more, it is possible to control a nonenzymatic oxidation reaction. Incidentally, the oxidase used herein is an oxidizing agent usable for articles of food (soybean products) and indicates food products materials including air, oxygen gas, soda hypochlorite, hypochlorous water, hydrogen peroxide water, ozone water, micro-bubble water, nano-bubble water, high-oxygen concentration water and dehydroascorbic acid (oxidized vitamin C), for example.

The present invention is characterized by a combination of a submerged friction-grinding unit for grinding down soybeans by friction in soybean-grinding water at a friction-grinding portion to obtain soybean soup, a heating unit for heating the soybean soup at at-least two stages and a connecting unit for connecting the submerged friction-grinding unit and the heating unit. The present invention provides an apparatus for producing soymilk, which couples the submerged friction-grinding unit, connecting unit and heating unit together and which is continuously configured airtightly. By the use of the present apparatus, it is possible to perform a method for producing soymilk or soymilk for tofu having a small grassy smell and well balanced in flavor and eating texture. Behind the heating unit, units ordinarily used for producing soymilk or tofu including a cooling unit, deaerating unit, separating unit and coagulating unit are optionally connected. The units disclosed in Patent Documents 3, 6 and 11-13 can be used as the submerged friction-grinding unit that is not particularly limited insofar as it has a mechanism capable of stably friction-grinding soybeans together with soybean-grinding water below water and can be used for a submerged friction-grinding method. The heating unit is preferably a continuous boiling unit equipped with a heater for continuously stepwise heating the soybean soup and a control system for temperature setting and temperature adjustment, for example. The connecting unit preferably comprises an airtight pipe. However, this is not limitative.

The present invention is characterized in that the connecting unit has a configuration comprising a retaining unit and a transferring unit. That is to say, the connecting unit disposed between the submerged friction-grinding unit and the heating unit is provided with the retaining unit for retaining the soybean soup temporarily or for a prescribed period of time. As a result, it is possible to adjust a balance in capacity between the submerged friction-grinding unit and the heating unit and a fluctuation and to stably heat the soybean soup. The retaining unit is a tank exposed to the atmosphere or a tank having a vent, or may be configured airtightly using a screw conveyor or a pipe. In addition, the retaining unit may be brought to a nearly airtight state through providing it with a stirring unit or a chilling and heat-retention unit capable of retaining the soybean soup to a temperature of 15° C. or less or through bringing an air space in contact with the soybean soup to a low-oxygen state.

The present invention is characterized in that at least one of the heating units is a batchwise unit. The heating unit of the present invention is preferably a batch unit pattern that is also used for the retaining step. For example, the soybean soup obtained by submerged friction-grinding is once preheated (first-stage heating) continuously, then a prescribed amount of the soybean soup is fed to the batch unit pattern and stored therein, and the stored soybean soup may be subjected to second-stage and subsequent-stage heating (second-, third-, fourth- and fifth-stage heating). In addition, a non-heated soybean soup obtained by the submerged friction-grinding may be introduced into the batch unit pattern and, in this case, the batch unit pattern is preferably provided with a control system for temperature setting or temperature adjustment. In order to avoid that the soybean soup is exposed to air, the interior of the unit pattern is beforehand filled with steam (or inert gas) to bring the interior to a low-oxygen state, and it is also effective that the upper space of the unit pattern is similarly filled with steam during heating.

The present invention is characterized in that the heating unit is a steam ejector, steam infusion unit or steam infusion unit for heating with steam supplied to the connecting pipe. Each heater of the heating unit (including the preheating unit) of the present invention adopts a direct heating system using a high-temperature high-pressure steam as a heat medium, uses steam injection for blowing steam to the soybean soup flowing into a pipe, steam infusion for heating through spray of the soybean soup in a vapor atmosphere or steam injection for blowing steam to the soybean soup, and is preferably a steam ejector having a sucking and transferring mechanism utilizing a steam flow. In addition, in the case of heating at approximately 180° C., a combination of hot-water mixing (high-temperature high-pressure water; direct rapid heating for injecting and mixing hot water having a temperature of 300° C. into and with soybean soup or soymilk) with indirect heating may be adopted.

The present invention is characterized in that the heating unit (including the preheating unit) is provided with a oxidant-supplying unit for injecting and adding oxidant liquid (emulsion or aqueous solution) for edible use including air, oxygen gas, soda hypochlorite, hypochlorous water, hydrogen peroxide water, ozone water, nano-bubble water and high-oxygen concentration water. The present invention lies in that the heating unit is equipped with the supply unit for injecting to the soybean soup having oxidase reduced in activity to one half or deactivated the oxidant liquid for edible use, such as air, oxygen gas, soda hypochlorite, hypochlorous water, hydrogen peroxide water, ozone water, nano-bubble water or high-oxygen concentration water. In the case of gas, such as air or oxygen, a configuration in which the gas is supplied under pressure from a compressor or gas cylinder is adopted. In the case of liquid, a configuration using a positive-displacement pump for injecting a prescribed amount of the liquid may be adopted. For example, a configuration having a supply pipe for high-temperature high-pressure steam that is a heat medium equipped with a steam ejector for sucking clear air and blowing air together with steam to the soybean soup may be adopted and, in this case, the effect of stirring by aeration can also be expected.

The present invention is characterized in that the connecting pipe is provided between the preheating unit and the heating unit with a stirring and mixing unit for stirring and mixing the soybean soup. The present invention lies in the provision of the stirring and mixing unit for the promotion of mixing a heat medium or an additive (a defoamer, pH adjuster, oxidant, etc.) in the heating unit. The stirring and mixing unit, when being disposed on the pipe, is preferably an ordinary static mixer or a rotary mixer having a rotor rotating at high speed and a stationary stator. It may be the rotary mixer or a stirrer with moving vanes in the case of the batchwise unit.

In the present invention, the heating unit (including the preheating unit) or the preceding or subsequent step thereof is preferably provided with a pressure-reducing or deaerating unit for pressure-reducing or deaerating the soybean soup. The present invention lies in the production of the deaerating unit for removing gas components, such as air, gas, etc. slightly contained in the soybean soup that has been subjected to preheating or heating. This is effective as a post handling in the case of positively mixing air as described above. In addition, since there is a case where gas components (carbon dioxide, for example) are generated by heating depending on the soybean soup in contact with oxidant (air etc.), the water quality or the kind of additive, it is desirable to perform the deaerating treatment immediately so as not to hinder the extracting step that is a post-step. Deaeration is performed before heating on a case-by-case basis to enable complete removal of air from the soybean soup having been subjected to submerged friction-grinding step. Additionally in short, a raw soybean soup being ordinarily friction-ground (preferably having a temperature of 15° C. or less) is deaerated and defoamed to enable acquisition of the same soybean soup as being subjected to the submerged friction-grinding step. Incidentally, a configuration may be adopted, in which semi-raw soymilk or soymilk having bean curd refuse separated at the separating step after the preheating step or heating step. In this case, particularly in the case of handling semi-raw soymilk, the separating step is preferred to be a submerged separating step. It goes without saying that an effect of removing a volatile unpleasant smell because of the deaeration and evaporation can also be expected.

Soymilk conceivable in the present invention is soymilk produced from the soybean soup obtained by the soymilk-producing method or soymilk-producing apparatus described above and having a soybean solid content concentration (10 to 17% w/w), pH (6.5 to 7.5) and viscosity of 2,000 mPa·s (cP) or less in a state of being chilled to 20° C. or less. The soymilk of the present invention is soymilk obtained particularly at the submerged friction-grinding step and, by promoting the oxidation of proteins (production of S—S cross linkage owing to SH groups) at the step between the submerged friction-grinding step and the heating step, having the viscosity thereof suppressed to 2,000 mPa·s (cP) or less even in the state of being chilled to 20° C., and being thinly viscous and easy to drink. Though soymilk obtained by ordinary submerged friction-grinding and boiling in accordance with the law generally has a light flavor certainly, it is the real nature that tofu produced from it particularly gives an impression left to be desired. When soymilk obtained by submerged friction grinding under the same producing conditions excluding friction grinding and using the same concentration and pH has a soybean solid content concentration particularly exceeding 14%, it has viscosity higher by 20% or more than, or several times as the case may be, that of soymilk obtained by ordinary friction grinding though this is the point not touched upon in the conventional literary documents. Tofu prepared under the same conditions is softer by around 10 to 50% and has a too soft and weak eating texture (negative elements as tofu products). For this reason, the soymilk of the present invention is characterized in that the viscosity is adjusted to 2000 mPa·s (cP) or less, desirably 1000 mPa·s (cP) or less, most preferably 1 to 200 mPa·s (cP), even when the submerged friction-grinding step has been taken and even in the case of concentrated soymilk having a soybean solid content of 14 to 17% w/w obtained not only under high-speed short-lasting heating conditions, but also under heating conditions including a low-temperature long-haul parameter or oxidation parameter from the standpoint of the addition of flavor. The same description as mentioned above is applicable to semi-raw soymilk obtained in the present invention through the heating step.

The soymilk of the present invention has viscosity, the upper limit and lower limit of which vary depending on the concentration thereof as shown in FIG. 8. FIG. 8 is a graph showing the relation between the concentration of soymilk and the viscosity thereof. When the soymilk has the viscosity exceeding the upper limit shown in FIG. 8, it cannot sufficiently be mixed with bittern with a coagulant mixer of an ordinary apparatus for producing packed tofu and has foams entrained therein readily. When the soymilk has the viscosity falling below the lower limit, it produces soft tofu due to insufficient heat treatment and is likely to generate phenomena that the produced tofu when being packed adheres to a pack and undergoes a color change to a pink color during being preserved though depending on kinds of soy soybeans. Incidentally, when soymilk has a soybean solid content concentration falling below 10% w/w, it can only produce soft silken tofu. In addition, it is difficult to produce soymilk having a concentration exceeding 17% w/w by an ordinary producing process (process of heating and then extracting soymilk obtained by friction-grinding soaked soybeans) without using a concentration device. Furthermore, when soymilk has a pH of 6.5 or less, it turns into a gel and is coagulated from the standpoint of the quality of soybean protein. When soymilk has a pH of 7.5 or more, it is difficult to coagulate with an ordinary coagulant and can only produce soft tofu.

The present invention preferably provides soymilk produced in accordance with the law from a soybean soup, the specific gravity of which is 1 or more and which is obtained by grinding soybeans by friction together with grinding water, and the produced soymilk is characterized in that the color difference of a value b representing a yellow color in the Hunter color appearance method is heightened by 0.20 or more in comparison with soymilk obtained by having air sufficiently mixed therein and in accordance with the law. Generally, soymilk obtained from the soybean soup friction-ground, with air entrained therein, is decolored through oxidation of the yellow pigments (polyphenols, such as isoflavone) in the soybeans to generally assume a faded white color. To the contrary, since soymilk obtained by submerged friction-grinding and boiling in accordance with the law is less affected by oxidation, it has a tendency to assume a canary yellow color. Though white tofu is preferred in some cases, tofu tinged with a yellow color soybeans have per se is expected to have a physiological property, such as an antioxidative property. The present invention provides soymilk which is obtained by heating under an oxidizing condition and which is characterized by strongly assuming a yellow color having the value b of 0.2 or more in comparison with the control group. In the Lab-based appearance system (Hunter color appearance method) representing a hue in the color appearance method, the color difference of 0.1 or more indicates the degree capable of sufficiently distinguishing the difference with the naked eyes. The control group indicates the case where a raw soybean soup obtained by submerged friction-grinding has air sufficiently entrained therein and, similarly in the case of the experimental group, the soymilk obtained through the heating, separating and deaerating steps is chilled to a temperature of 20° C. or less and measured in terms of the value of b (indicating a yellow color on the + side and a blue color on the − side) with a colorimeter. The difference is a color difference and, when it is 0.2 or more, the soymilk falls in the category of soymilk according to the present invention.

The present invention preferably provides soymilk for packed tofu and, therefore, entails a problem that in the case where the soymilk has excessively high viscosity when being chilled, it is difficult to mix with a coagulant to make it difficult to produce either homogeneous tofu or hard tofu exhibiting a good eating texture.

Effects of the Invention

According to the present invention, the raw soybean soup obtained in a submerged friction-grinding unit is fed to a heating unit while being preheated and is further heated with the heating unit to prevent heating unevenness and control functions of various kinds of oxidizing and degrading enzymes responsible for a grassy smell or an astringent taste, thereby inducing appropriate thermal denaturation of protein and an appropriate flavor to enable processing the soymilk obtained, when having been coagulated, into tofu of quality high in water retentivity and elasticity and rich in flavor.

Best Mode For Carrying Out The Invention

The best mode for carrying out the invention will be described in detain hereinafter with reference to the drawings.

Conventional Example

FIG. 2 schematically shows a conventional soymilk-producing apparatus. The conventional soymilk-producing apparatus comprises a submerged friction-grinding unit M, a slurry tank B, a transfer pump Pp, a batchwise steam can N an extracting unit S, a soymilk tank T, a connecting pipe P1 that connects a vent Bj of the slurry tank B and the transfer pump Pp, a connecting pipe P2 that connects the transfer pump Pp and the steam can N and a connecting pipe P3 that connects the steam can N and the extracting unit S. The submerged friction-grinding unit M comprises a hopper portion Mh for introducing raw-material soybeans and soybean-grinding water, a feed controlling unit Mm for feeding the raw-material soybeans and soybean-grinding water and a grinder portion Mg for grinding down the raw-material soybeans by friction.

A conventional soymilk-producing method, as shown in FIG. 2, comprises supplying from a raw-material supply tube D1 raw-material soybeans swollen with water for soak and, at the same time, throwing soybean-grinding water from a water pipe W1 into the hopper portion Mh and subjecting the raw-material soybeans to submerged friction-grinding to produce a raw soybean soup. The raw soybean soup is discharged from the vent Mj into the slurry tank B. The slurry tank B is a container for transiently storing the raw soybean soup therein. When one batch of raw soybean soups has been stored in the slurry tank B, water and a defoamer are added from a water pipe W2 in an amount corresponding to a target soymilk concentration. Since the raw soybean soup is easy to entrain air in the slurry tank B, addition of the defoamer is needed. The stored raw soybean soup is discharged from the vent Bj into the transfer pump Pp and transferred from the transfer pump Pp into the steam can N that is a heating unit. The raw soybean soup thus transferred is heated with heating steam supplied from a steam pipe J2. The soybean soup thus heated is fed via the connecting pipe 3 to the extracting unit S and separated with the extracting unit S into soymilk and bean curd refuse. The soymilk thus produced is transported into a soybean tank T.

In the conventional soymilk-producing method, as described above, since one batch (one steam can) of raw soybean soups is stored in the slurry tank B and then fed to the steam can N, it takes some time to store one batch of raw soybean soups in the slurry tank B until a start of heating the raw soybean soups having subjected to submerged friction-grinding and then fed to the steam can B. In addition, since the raw soybean soup comes into contact with the ambient air in the slurry tank B, there is room to allow oxidizing and degrading enzymes contained in soybeans to fulfill their function to thereby induce an unpleasant smell.

(First Embodiment of the Present Invention)

FIG. 1 schematically shows a soymilk-producing apparatus Z1 of the present invention. The soymilk-producing apparatus Z1 of the present embodiment comprises a submerged friction-grinding unit M, a transfer pump Pp, a preheating unit Y1, a pressure adjustment portion Hb1, a stirring and mixing unit K1, a batchwise steam can N a extracting unit S, a soymilk tank T, a connecting pipe P1 that connects a vent Mj of the submerged friction-grinding unit M and the transfer pump Pp, a connecting pipe P2 that connects the transfer pump Pp and the steam can N and a connecting pipe P3 that connects the steam can N and the extracting unit S. The submerged friction-grinding unit M, batchwise steam can N and extracting unit S used here are conventional ones.

The raw soybean soup produced by the submerged friction-grinding is discharged from the vent Mj. Since the vent Mj is connected to the transferring pipe Pp with the connecting pipe P1, the produced soybean soup is continuously transferred with the transfer pump Pp to the preheating unit Y1. The present embodiment is provided with the pump Pp (preferably a pump having quantitativity, such as a rotary pump, a MEMO pump, a gear pump) to enable supplying the soybean soup "go" rapidly to the preheating unit Y1. Instead of the pump Pp, a unit utilizing a spontaneous flow by gravitation or a siphon phenomenon, or decompression suction by a decompression vacuum unit additionally provided on the preheating unit Y1 may be used. Otherwise, a unit used together with the preheating unit Y1 for supplying the soup, such as a steam ejector, may be used.

The connecting pipe P2 that connects the transfer pump Pp and the steam can N is equipped with the preheating unit Y1, pressure adjustment portion Hb1 and stirring and mixing unit K1. These units are attached to the outside the connecting pipe P2, a processed connecting pipe P2 or a divided connecting pipe P2 appropriately depending on their structures. The preheating unit Y1 is for immediately heating the soybean soup obtained in the submerged friction-grinding unit M and, since the soybean soup is immediately preheated in the connecting pipe P2 in a state blocked off from the ambient air, the oxidizing and degrading enzymes contained in the soybeans are deactivated to suppress an unpleasant smell from being generated. The pressure adjustment portion Hb1 is a valve for keeping constant the pressure before being applied to the pressure adjustment portion Hb1 and, when the pressure has been more than a set pressure, allows excess pressure to escape via itself to keep constant the pressure being applied to the pressure adjustment portion Hb1. For this reason, the soybean soup preheated all times under a constant range of pressure can be fed to the steam can N Though the pressure adjustment portion Hb1 in FIG. 1 is disposed behind the preheating unit Y1, it may be disposed before or immediately behind the transfer pump Pp or before the preheating unit Y1 insofar as it is disposed on the connecting pipe P2. The stirring and mixing unit K1 is for making the fed soybean soup homogenous, and the soybean soup is homogenized upon being fed to enable uniform preheating (heating) of the soybean soup.

The preheating unit Y1 is a steam injection unit or a steam ejector. The steam injection unit injects a high-temperature high-pressure steam jk from it as shown in FIG. 3(a) and is disposed in the direction perpendicular to an advancing direction a of the soybean soup "go" or may be disposed aslant relative to the advancing direction a and is taper-processed relative to the advancing direction a for feeding the soybean soup "go" in the advancing direction a while directly heating the same. On the other hand, the steam ejector is a device, as shown in FIG. 3(b), provided with a steam nozzle disposed in the vicinity of a supply port for the soybean soup, thereby ejecting a high-temperature high-pressure steam from the steam nozzle toward the advancing direction a and feeding the soybean soup "go" in the advancing direction a while directly heating the soybean soup "go". Otherwise, steam infusion (not shown) can be used for directly heating by steam jk and feeding the soybean soup "go". For the purpose of shortening the preheating time, in addition to the air steam ejector, steam injection or steam infusion, indirect heating by high-temperature high-pressure water, hot water or a heat exchanger, conducting heating (Joule heating), IH heating and microwave heating may be used solely or appropriately in combination. The present embodiment may have a configuration in the soybean soup is fed from the vent Mj to the preheating unit Y1 not via the transfer pump Pp, but directly as shown in FIG. 12. In this case, as the preheating unit, a heating unit concurrently having a steam ejector Y2 and a transfer force is preferably used and is preferably provided with means used in a post-step for maintaining the flow rate or pressure of the soybean soup constant, such as a back pressure regulating valve, a control valve, an orifice, thereby enabling maintaining the submerged friction-grinding unit under operation in an airtight state. That is to say, it is unnecessary to bring the submerged friction-grinding unit to a completely sealed state and it will suffice that the unit is merely filled with the soybean soup so as not to entrain air during the course of the friction-grinding. The starting operation or the aborting and restarting operations is or are performed using an automatic opening-closing valve provided separately, for example. In addition, a retaining step Ba may be taken between the submerged friction-grinding step M and the heating step N (FIGS. 10(a) and 10(b)). Furthermore, as shown in FIG. 11, a continuous boiling system may be used as the heating unit N in place of the batchwise one.

The stirring and mixing unit K1 is disposed between the preheating unit Y1 and the heating unit N and, in the present embodiment, is connected directly to a rectifier or static mixer for stirring and mixing the soybean soup "go" homogeneously. The rectifier or static mixer is a mixer not provided therein with any power source and is a unit for mixing steam-condensing water and slurry through repetition of dispersion and collision thereof when a slurry raw soybean soup passes through a chamber partitioned inside the rectifier or static mixer. By combining a steam injection unit with the rectifier, the steam injection unit with the static mixer, or the steam injection unit with the rectifier and static mixer, the soybean soup produced by the submerged friction-grinding can directly be fed in a homogenous state to the steam can N while being rapidly preheated, thereby giving a mild flavor (savoriness) a soybean soup has per se.

Though the heating unit N may be of either a continuous type or a batchwise type, it is desirable that the submerged friction-grinding unit M and preheating unit Y1 are of continuous type and are operated intermittently and that the heating unit N is of a batchwise type and is operated intermittently. The heating unit N may be of a continuous type and can be operated continuously. In the present embodiment, as shown in FIG. 4, a direct steam-blowing heating unit N using a batchwise steam can is used. However, an indirect heating unit having a heater embedded in a double wall, such as a batch unit pattern, may be used instead. In these units, a soybean soup-introducing n2 is connected to a can body n1 in which a soybean soup-stirrer n3 and an injection pipe n4 that is the steam-blowing unit are disposed, and the soybean soup is treated by a series of operations while soybean ingredient quality alteration is suppressed in a substantially hermetically-sealed state, with contact between the raw soybean soup and air avoided as much as possible, thereby eliminating heating unevenness. The heating unit N is a direct steam-blowing heating unit using the batchwise steam can, is provided with means for supplying steam or compressed inert gas and may heat the soybean soup while retaining the internal pressure thereof higher than a saturated steam pressure of the soybean soup or covering the surface of the soybean soup with a drop lid. The heating unit N is a direct steam-blowing heating unit using the batchwise steam can, is provided with means for supplying steam or compressed inert gas and heats the soybean soup while retaining the internal pressure thereof higher than the saturated steam pressure of the soybean soup to make it possible to heat the soybean soup while suppressing the contact thereof with air within the unit pattern. That is to say, making the cooking scale larger to some extent enables slow heating and makes the raw materials easy to balance and heating unevenness difficult to induce. Since the raw materials are easier to balance, the flavor is easier to adjust and heating unevenness is more difficult to induce in the case of boiling the soybean soup collectively using a boiling unit pattern than in the case of boiling the soybean soup continuously using a pipeline, it is possible to produce delicious soymilk. In addition, by retaining the internal pressure of the unit pattern higher than the saturated steam pressure of the soybean soup while covering the surface of the soybean soup with a drop lid, it is possible to attain uniform heating while suppressing bubbling. The extracting unit S fulfills the function to separate the soybean soup into a solid (bean curd refuse) and a liquid (soymilk).

Next, the soymilk-producing process using the soymilk-producing apparatus Z1 will be described (FIG. 13). Though the configurations of soybeans including raw soybeans, powered soybeans, dehulled soybeans and soaked soybeans soaked in water are not particularly limited, the soaked soybeans which are soaked in water and which have heretofore been adopted are preferable from the standpoints of the quality and yield of tofu. FIG. 13(a) shows a flow of the producing process in the case where neither a retaining step Ss nor an oxidant-injecting process Ss is taken, and FIGS. 13(b) and 13(c) show flows of the producing process in the case of the retaining step St or oxidant-injecting process Ss is taken. The (main) heating step in FIG. 13(a) can double as the retaining step in the case of the batchwise heating. Incidentally, the step shown by a chain line in FIG. 13 is not necessarily provided.

In the present embodiment, since soybeans and soybean-grinding water are subjected to submerged friction grinding at the friction-grinding portion Mn by means of the submerged friction-grinding unit M to produce a raw soybean soup, this means that the soybeans are friction-ground in water having a low oxygen concentration, bringing the raw soybean soup to a state in which the ingredient-oxidizing reaction by lipoxygenase have been suppressed. The specific gravity of the raw soybean soup containing no foam is in the range of 1.00 to 1.10 that is higher than that of water. Incidentally, since soybeans are ground down by friction while entraining air therein in the conventional wet friction-grinding unit, a raw soybean soup to be obtained contains a great number of minute foams and is brought to a state in which the ingredient-oxidizing reaction by lipoxygenase is immediately progressing. The specific gravity of the raw soybean soup is in the range of 0.8 to 0.9 that is lower than that of water.

It is preferred that water having dissolved oxygen substituted with inert gas, deaerated water, chilled water or pH-adjusted water is used as the soybean-grinding water. It has been known that there are optimum pH, optimum temperature and suitable substrate concentration for an enzymatic activity. Therefore, by using water having the dissolved oxygen substituted with inert gas or deaerated air (having the dissolved oxygen concentration of 1 ppm or less) as the soybean-grinding water in addition to the preheating unit Y1, it is possible to suppress an oxidase reaction at a low oxygen concentration. In addition, by using chilled water (clear water having a temperature of 0 to 10° C.), it is possible to suppress reactions of various kinds of enzymes. Furthermore, by using as the soybean-grinding water pH-adjusted water, specifically, water adjusted in pH toward a weak alkali side (pH 7 to 9, preferably pH 7 to 8) so as to fall outside the optimum pH of lipoxygenase or β-glucosidase, it is possible to suppress the enzymatic reaction from progressing. Moreover, a combination of these kinds of water is further effective. In fact, though the dissolved oxygen concentration of ordinary tap water is in the range of 1 to 20 ppm, even the water in this range can sufficiently bring about the effects of the present invention. Incidentally, it is also effective to adjust part of, preferably all of, the water quality of water supplied "in an amount corresponding to the target soymilk concentration", water used for washing or soaking soybeans, Tofu pouch water (in the case of material for deep-fried bean curd), water with which a coagulant is dissolved, packed water and water-exposed water, besides the soybean-grinding water.

Next, the raw soybean soup obtained in the submerged friction-grinding unit M is immediately transferred via the connecting pipe P1 to the preheating unit Y1 by means of the transfer pump Pp and, at the preheating unit Y1, rapidly preheated (preheating step). At this preheating step, the oxidizing and degrading enzymes, such as lipoxygenase, polyphenol oxydase or peroxide lyase, and glycolytic enzymes, such as β-glucosidase, can rapidly be deactivated.

The raw soybean soup obtained in the submerged friction-grinding unit M is heated by means of the preheating unit Y1 to 60° C. to 80° C. for 0.1 to 60 sec inclusive from the time the soybean soup has been produced. Subsequently, the soybean soup is heated at a temperature more than the aforementioned temperature (60° C. to 80° C.), or up to 180° C. in the case of high-temperature pasteurization), for 0.1 sec to 60 min (heating step).

It is generally known that enzymes, such as lipoxygenase, β-glucosidase, etc., are deactivated at a temperature of 80° C.

or more. According to academic document 1, however, it is reported that the glucosidase activity is reduced one half at approximately 50° C. and lipoxygenase (L2 and L3) activity at approximately 60° C. When the soybean soup is excessively rapidly heated by means of the heating unit, however, it smells burning due to the heating unevenness (temperature variation) or is easy to foam and, when tofu is produced from the soybean soup, it adheres to a pack in the case of packed tofu and to filtering cloth in the case of cotton tofu, thereby entailing problems of inducing defective products and a product loss or deteriorating the eating texture and flavor of the products. In addition, when the raw soybean soup is unduly heated, tofu obtained becomes brittle and weak in elasticity. Therefore, the soybean soup obtained in the submerged friction-grinding unit M is preheated to 60 to 80° C. for 0.1 sec to 60 min inclusive (preferably 0.1 to 60 sec inclusive) from the time the soybean soup has been produced, to thereby immediately deactivate the oxidizing and degrading enzymes and subsequently heated for 0.1 sec to 60 min inclusive to a temperature more than the aforementioned temperature (60 to 80° C.), to 90 to 110° C. in the case of ordinary soymilk for tofu or to 180° C. particularly in the case of high-temperature pasteurization), thereby inducing thermal denaturation of soybean protein and flavor of aroma constituents by heat. After reaching a constant temperature, heating is weakened, or stopped and combined appropriately with aging for 0.1 sec to 60 min and steaming. In this case, however, the temperature is preferably the same as or higher than the temperature in the preheating step. Under conditions of high temperature and short period of time (100 to 180° C. and 0.1 to 1 min inclusive, for example), the antiseptic effect with excessive thermal denaturation of proteins avoided can be expected. Thus, by combining rapid temperature elevation of a soybean soup up to 60 to 80° C. with low-temperature or slow heating ("steaming", "aging", etc.), it is possible to suppress oxidative decomposition and quality alteration of lipids or ingredients and produce soymilk for secure tofu enhanced in flavor and well coagulative. Though the soymilk has a luminous and yellowish-white color and a plain taste, it is possible to produce soymilk easy to drink as a soymilk drink by temperature elevation up to 130° C. to 140° C. and further up to 180° C. for an instantaneous short period of time in the case of aiming at long-life nature. That is to say, in the case of the soymilk drink, there is no problem if heating is performed under conditions of high-temperature flash pasteurization (retention to a temperature of 130 to 140° C. for 2 to 3 sec, for example). Heating under these conditions, however, produces soymilk not suitable for tofu. In the heating by a steam-blowing method, such as steam infusion, steam and soymilk are brought into direct contact with each other to enable instantaneous heat sterilization and, since the amount of heat given to the entire soymilk is small, the soymilk tastes refreshing and clear. In addition, though the heating by a method of blowing soymilk into steam, such as steam infusion, can be performed under an atmospheric pressure condition, the heating may be performed by injecting soymilk under a pressurized condition. Since the higher the pressure the higher the temperature of the steam to be used and set is, the method is effective for the case of short-lasting heating.

As the heating unit N either the continuous pipe arrangement or the batchwise steam can may be used. In the continuous pipe arrangement or batchwise steam can N the unit pattern N is filled with high-temperature steam beforehand by means of the steam-blowing unit n1 and the steam is continuously fed into the unit pattern, thereby enabling suppression of contact between the raw soybean soup and air, and the unit pattern can concurrently be used as the preheating unit. That is to say, the soybean soup fed into the heating unit N is fed into the steam can N kept in a low oxygen state, in which the continuous pipe arrangement or batchwise steam can N has had air expelled from it beforehand by means of the steam-blowing unit n1 and has been filled with high-temperature steam, and is smoothly preheated. A steam infusion unit having a unit pattern N filled with high-temperature steam and heating a soybean soup in a thin-film state can be put to practical use.

The extracting unit (separation unit) S separates a soybean soup into soymilk and bean curd refuse, and a soymilk-coagulating method is an ordinary one and is not particularly limited. In the present invention, a so-called method of extract after cooking is suitably used. However, a raw soybean soup that has been subjected submerged friction grinding is once separated into raw soymilk and raw bean curd refuse using a submerged separation unit (that is required to be a submerged extracting unit because of a high oxidase activity) and the raw soymilk may be fed to the preheating unit Y1. In addition, the soybean soup preheated by the preheating unit Y1 is separated by the separation unit (that may perform either a submerged extract or a conventional open-type extract) S into semi-raw soymilk and semi-raw bean curd refuse and the semi-raw soymilk may be fed to the heating unit (FIGS. 10(d) and 10(e)). Even after the deactivation of the oxidase, if it is necessary to suppress non-enzymatic oxidation, the separation unit S or coagulation equipment not in contact with air is desirably used. In the extracting step, in order to suppress the activity of enzymes remaining, if any, the soybean soup temperature is preferably 15° C. or less, or 60° C. or more and 100° C. or less.

In the meanwhile, Patent Documents 1 and 2 describe therein that it is better to heat a soybean soup rapidly as much as possible, thereby deactivating fatty acid oxidase. In the unduly rapid heating, though SH groups of a protein are easy to remain without being oxidized, S—S bonds are deficient to make thermal denaturation of the protein easy to occur, increase the viscosity of soymilk, become easily uneven when mixing bittern, fail to produce tofu having elasticity and water retentivity and therefore produce tofu that is too soft and weak and not crisp in eating texture. This tendency is conspicuous insofar as concentrated soymilk for tofu particularly has a soybean solid content concentration (soymilk concentration) of 10% w/w to 17% w/w. The amount of SH groups in soymilk forms S—S covalent bonds in or between molecules due to the thermal denaturation of soybean proteins, i.e. disassociation or distortion of a higher-order structure of globular protein, contributes to gelation or gel strength and affects the eating texture and water retentivity of tofu.

EXAMPLE 1

A raw soybean soup in an amount of about 54 kg (specific gravity: 1.04; 15° C.; corresponding to 10.5 kg of raw soybeans) was prepared as Example 1 (soymilk 2) by the steps of soaking domestic soybeans produced in 1995 (Nakasennari produced in Nagano Prefecture; medium grains) in flowing water of 15° C. for 20 hours to allow the soybeans to absorb water (water absorption multiplying factor: 2.3 times) and grinding down the soaked soybeans by friction in accordance with a submerged friction-grinding method for 3 minutes at a capacity of 3.5 straw bags/hr and at a soybean-grinding water flow rate of 10 l/min. In addition, a soybean soup in an amount of about 54 kg (specific gravity: 0.85; 15° C.; corresponding to 10.5 kg of raw soybeans) was similarly prepared as Comparative Example 1 (soymilk 1) by friction grinding while having air entrained therein in accordance with a conventional friction-grinding method. Each of the soybean soups was directly fed to a heating unit (soymilk-producing plant manufactured by Takai Tofu & Soymilk Equipment Co. under the model code of NS2000-S; batchwise steaming can with a stirrer) without being preheated, heated to a temperature of 15 to 103° C. at a maximum temperature elevation speed of 100° C./min for about 2 minutes (first-stage heating) and, upon the temperature reaching 103° C., separated into soymilk and bean curd refuse with an extracting unit S (manufactured by Takai Tofu & Soymilk Equipment Co. under the product name of Silius). Thus, about 13% brix of soymilk 1 and soymilk 2 were obtained. The relation between the heating time and the temperature of the soybean soups is shown in FIG. 9.

On the other hand, in an example performing preheating (first-stage heating), a heating unit (soymilk-producing plant manufactured by Takai Tofu & Soymilk Equipment Co. under the model code of NS2000-S) equipped with a steam injection device having a built-in stationary mixer was used to supply steam having a steam pressure of 0.4 MPa to the steam injection device Y1 (1.5 S, 250 mm in length) and steam having a steam pressure of 0.3 MPa to the heating unit N. The soybean soup obtained by the submerged friction-grinding was subjected to the first-stage heating with the steam injection device Y1 in about 7 seconds while transporting a sanitary pipe of 1.5 S having a length of 1.8 m at a flow rate of about 18 l/min (current speed of 0.27 m/sec) by means of an airtightly connected transfer pump. In Example 2 (soymilk 3), a soybean soup was subjected to the first-stage heating in which temperature elevation up to 80° C. was performed for one second (70° C. per sec), then retained for about 2 minutes, heated to 103° C. at a temperature elevation velocity of about 20° C./min and, upon the temperature reaching 103° C., separated into soymilk and bean curd refuse with an extracting unit S. Soymilk 3 was thus obtained. In Example 3 (soymilk 4), a raw soybean soup was subjected to a first-stage heating in which temperature elevation up to 50° C. was performed for one second (45° C. per sec), then retained for about 2 minutes, subjected to a second-stage heating in which temperature elevation up to 80° C. at a temperature elevation velocity (30° C./min), retained (or slowly heated) for about three minutes, heated to 103° C. at a temperature elevation velocity of about 20° C./min and, upon the temperature reaching 103° C., separated into soymilk and bean curd refuse with the extracting unit S. Soymilk 4 was thus obtained. Samples of the soymilk thus obtained were tested for a soymilk concentration (several grams of samples were introduced into an aluminum weighing can, dried to 105° C. for 24 hours in a constant temperature reservoir and then subjected to precise weighing), pH (measured at room temperature using a glass-electrode pH meter (Horiba, M-8s), color hue (reflection measurement with a colorimeter (Minolta CR-100); Hunter color appearance method), viscosity (a B-type viscosimeter (B8L manufactured by Tokyo Scientific Measuring Instruments Co., Ltd.) and an SH group great deal pursuant to the DTNP method (Food Science and Technology Research, Vol. 36, No. 9, pp. 707-711, 1989), and these values were relatively compared. In addition, the samples of soymilk were chilled to 10° C., 8 g of bittern (product name: Kiyomizu (crude magnesium chloride from seawater) was added and mixed with 1 l of soymilk, the resultant mixture was filled and sealed in a heat-resistant container for tofu, then boiled at 80° C. for 45 min and chilled to experimentally produce packed tofu. The next day, a break test was performed at room temperature measuring the hardness of tofu (cut out to have a diameter of 23 mm and a height of 20 mm) and using a rheometer (manufactured by Fudo Kogyo Co., Ltd. under model code of NRM-2002J, a plunger having 20 mm in diameter, a specimen support-elevating velocity of 60 mm/min, a maximum load of 1 kg, a recording paper-feeding velocity of 120 mm/min) to perform a hardness measurement at room temperature. Each sample was measure at 3 to 5 point, and the average value in break power was used as hardness. In addition, twelve panelists tasted and evaluated the samples. The results thereof are shown in Table 1. Incidentally, the numerical values therein are average values. In addition, part of each of soymilk was subjected to analysis by a smell identification device to be described later.

TABLE 1

| | Com. Ex. 1 Soymilk 1 | Example 1 Soymilk 2 | Example 2 Soymilk 3 | Example 3 Soymilk 4 |
|---|---|---|---|---|
| Soymilk concentration (% w/w) | 12.2 | 12.1 | 12.2 | 12.1 |
| Soymilk pH | 6.64 | 6.69 | 6.67 | 6.65 |
| Soymilk viscosity (cP) | 43.1 | 38.4 | 65.3 | 253 |
| Soymilk SH group corresponding value | 20.8 | 24.7 | 23.1 | 22.2 |
| Soymilk evaluation Points | 53 | 65 | 60 | 58 |
| Comments | Strong grassy smell in a thinly viscous state and bitter aftertaste | Thinly viscous state, refreshing aftertaste without grassy smell and light flavor | Sweet aroma without grassy smell and slightly thickly viscous state | Slight grassy smell, sweet aroma and thickly viscous state |
| Tofu hardness (gf/cm$^2$) | 51.4 | 37.4 | 44.3 | 49.9 |
| Tofu evaluation Points | 63 | 52 | 66 | 71 |
| sa | Bitter aftertaste in elastic state | Softness and light taste | Sweet taste in soft state | Hardness and sweet taste in elastic state |

According to Table 1, the Soymilk SH group corresponding value was largest in soymilk 2, then in soymilk 3, soymilk 4 and smallest in soymilk 1 in the control group. Though soymilk 2 had the highest point as regards the soymilk evaluation, it was given the comments that it had a light taste. Though tofu produced from soymilk 2 was soft and had a refreshing aftertaste, the evaluation point thereof was not good. Tofu produced from soymilk 4 had the highest evaluation point. Particularly, the result was that the hardness of tofu and the viscosity of soymilk contradicted the SH group corresponding value. In soymilk 4 in particular, an appropriate oxidation reaction was made through the first-stage heating in the range of 15 to 50° C. and the temperature retention to proceed with S—S formation of SH groups (oxidation), make the viscosity difficult to give and make the physicality of tofu hard, and the heating in the range of 80 to 100° C. and the temperature retention could produce an appropriately sweet flavor and afford a sweet flavor to soymilk and tofu. It was conceivable that tofu produced from soymilk 2 or 3 became soft because the oxidation action of oxidase was suppressed to fail to proceed with S—S formation of SH groups (oxidation). Thus, it was conceivable that excessively rapid heating in the first-stage heating (preheating step) brought about an adverse effect relative to the eating texture and flavor of tofu. It was proved that the present invention provided a method that preheated a soybean soup obtained by the submerged friction-grinding at a temperature in the range of 50° C. to 70° C. under the airtight and low-oxygen conditions or airtightly controlled state and promoted S—S bonds of proteins in the flavor range allowable in terms of soymilk and tofu products while controlling the oxygen concentration in a temperature range making mild the action of reducing the activity of oxidase to one half particularly at a temperature in the range of 50 to 70° C. and that tofu having both an elastic and smooth eating texture and a refreshing flavor could be produced.

COMPARATIVE EXAMPLE 2

Soymilk was prepared by following the procedure of Comparative Example 1 using soybeans similar to those in Comparative Example 1 in the same soymilk plant as in Comparative Example 1 except for the use of a steam ejector unit Y1 as soybean soup-transferring means. The soymilk (soymilk 5) thus obtained was subjected to smell distinguishing test together with the aforementioned soymilk 3 and 4.

The soymilk each obtained in Examples 2 and 3 and Comparative Examples 1 and 2 was inserted in an amount of 5 ml in a sample bag cleansed with nitrogen gas until any smell disappeared to replace the air in the bag with the nitrogen gas. The nitrogen gas left standing at room temperature for about 2 hours was used as a specimen (gas) for measurement. Measurements were made at room temperature using a smell distinguishing device FF-2A (manufactured by Shimadzu Corporation) and a measurement sequence A smell under the condition of a gas-sucking period of time of 60 minutes. The data thus obtained were processed using software for analysis (manufactured by Shimadzu Corporation). The results thereof are shown in Table 2.

TABLE 2

|  | Comp. Ex. 1 | Comp. Ex 2 | Ex. 1 | Ex. 2 |
| --- | --- | --- | --- | --- |
| Degree of similarity in smell (%) | 72 | 66 | 59 | 52 |
| Value of contribution to smell | 15 | 14 | 12 | 11 |

The degree of similarity in smell shows how the quality of a smell is close to what kind of system. Here, it shows the smell quality is close to aldehydes (having a stimulating grassy smell, burnt smell and stimulating sweet-sour smell) to what extent. When the degree of similarity to aldehydes was calculated as 50%, this meant that the similarity to aldehydes was 50%. The intensity in smell of aldehydes (having a stimulating grassy smell, burnt smell and stimulating sweet-sour smell) was expressed by an odor index-corresponding value. Since aldehyde also contains n-hexanal, it is important as a smell criterion.

It is found from Table 2 that the generation of an unpleasant smell of Example 3 (soymilk 4) is most suppressed and that in order to suppress the generation of the unpleasant smell it is effective to reduce the activity of the oxidizing and degrading enzymes in the soybeans to one half through short-lasting heating to at least 50° C. in a low-oxygen state.

Comparative Example 1 exhibiting the strongest unpleasant smell and Example 2 (soymilk 3) exhibiting the relatively weak unpleasant smell found from the results of the smell-distinguishing test were tested for a peroxide value. While lipids are subjected to oxidative decomposition by the oxidizing and degrading enzymes in soybeans, the peroxide value is one of criteria indicating the degree of oxidation of lipids. Through the measurement of the peroxide values, the degrees of oxidation by the oxidizing and degrading enzymes were compared. As shown in FIG. 5, the peroxide value in Comparative Example 1 was 7.0 meq/kg and that in Example 2 was 3.7 meq/kg, and it was found that the soymilk having the soybean soup preheated within a short period of time and continuously heated exhibited a lower value in peroxide value. It is presumed from this fact that the soymilk-producing method in Example 2 suppresses the activity of the oxidizing and degrading enzymes more than that in Comparative Example 1 and consequently that the generation of an unpleasant smell is suppressed.

COMPARATIVE EXAMPLE 3

Next, as shown in FIG. 2, soaked soybeans were subjected to submerged friction grinding (under water having a temperature of 15° C.) to obtain a slurry soybean soup, one batch (one unit pattern) of the soup was stored in the slurry tank (soybean soup tank) B, a proper quantity of water (calculated from the values of the soybean water absorption, grinding water amount, soymilk concentration set point, soybean amount per unit pattern) was added (a defoamer further added in many cases, but nothing in Example) to the stored soup, and the raw soybean soup added with the water was fed to the boiling can N. The raw soybean soup fed to the boiling can N was heated to 106° C. within 5 minutes through the adjustment of a steam pressure and a valve travel of the steam injection unit and, immediately thereafter, separated into soymilk (soymilk 6) and bean curd refuse using the extracting unit S. The relation between the heating time and temperature of the raw soybean soup in the boiling can N is shown in FIG. 6.

EXAMPLE 4

As shown in FIG. 1, soaked soybeans were subjected to submerged friction grinding (under water having a temperature of 15° C.) to obtain a slurry soybean soup which was fed to the boiling can N with the pump Pp. The soup-feeding pump Pp was provided on an exit thereof with the steam injection unit Y1 and the soybean soup was preheated to 80° C. immediately after passing by the soup-feeding pump Pp. It took for the soybean soup obtained by the friction grinding several seconds to be preheated. In addition, the stationary mixer K1 was disposed behind the steam injection unit Y1 in order to uniformize the preheating and, when the soybean soup was passed through the inside of the stationary mixer, it was stirred and mixed. The preheated soybean soup was further heated with the batchwise boiling can N and heated to 106° C. within 5 minutes, similarly to the case in Comparative Example 3, with the steam injection unit. The soybean soup immediately after being heated was separated with the extracting unit S into soymilk (soymilk 7) and bean curd refuse. The relation between the heating time and the temperature of the soybean soup in the boiling can N is shown in FIG. 6.

The soymilk 7 and soymilk 6 obtained respectively in Comparative Example 3 and Example 4 were measured with a taste-recognizing device SA402B (manufactured by Intelligent Sensor Technology, Inc.). Seven kinds of sensors were used for this measurement. In the measuring method, a reference potential (Vr) was first measured in a tasteless reference solution and then a potential (Vs) was measured in a sample (soymilk). The two kinds of soymilk were simply washed together, with the reference solution, and a reference potential (Vr') was measured again in the reference solution. The so-called before-taste (sakiaji) is expressed as Vs-Vr, is a taste a person feels initially when the food has been put into his/her mouth and corresponds to a comprehensive taste sensation. The aftertaste (atoaji) is expressed as Vr'-Vr and, from this, taste sensations of bitterness and acerbity flavors can be obtained. The reference solution used comprised KCl (30 mM) plus a tartaric acid (0.3 mM).

As a result of measurement, soymilk prepared in accordance with the conventional process (Comparative Example 3) and soymilk according to the present process (Example 4) had a difference in measurement value. That is to say, the acerbity and discordant flavors and bitterness are smaller in Example 3 than in Comparative Example 3, and a minus value in acerbity flavors is increased. Though the value of acerbity flavors in FIG. 7 is minus, this is because the relative measurement is adopted. Since the smaller the measurement value, the lower the taste sensation is, it is found that the unpleasant tastes (acerbity and discordant flavors, acerbity flavors, and bitterness) are suppressed in the case of combining the submerged friction grinding with the preheating rather than the conventional process. Incidentally, one graduation on the axis of ordinate in FIG. 7 corresponds to a Weber fraction of 20% and is the minimum unit at which a person can infallibly feel a difference with his/her tongue.

On the other hand, twelve persons sampled and evaluated soymilk 6 and soymilk 7. The results thereof are shown in Table 3. Incidentally, each of the numerical values is the average value.

TABLE 3

| | Tasting evaluation | |
|---|---|---|
| | Evaluation point | Comments |
| Com. Ex. 3 | 73.7 | Strongly bitter aftertaste |
| Ex. 4 | 79.6 | Refreshing aftertaste and strongly sweet taste |

As shown in Table 3, the evaluation results obtained indicated that the soymilk according to the conventional process (Comparative Example 3) exhibited a bitter taste and that the soymilk according to the present process (Example 4) exhibited a refreshing aftertaste without a bitter taste. From the correlation between the evaluation results and the objective sensory evaluations using a taste sensor shown in FIG. 7, it was found that the difference in taste could sufficiently be recognized.

EXAMPLE 5

Soymilk was obtained using the same producing method and apparatus as in Example 3. To be specific, a soybean soup in an amount of about 48 kg (specific gravity: 1.05; 14° C.; corresponding to 11.1 kg of raw soybeans) was prepared by the steps of soaking U.S. soybeans produced in 2006 (produced in Ohio; small grains) in flowing water of 13° C. for 12 hours to allow the soybeans to absorb water (water absorption multiplying factor: 2.14 times) and grinding down the soaked soybeans by friction in accordance with a submerged friction-grinding method for 3 minutes at a capacity of 3.7 straw bags/hr and at a soybean-grinding water flow rate of 8.0 l/min. Each of the soybean soups was directly fed to a heating unit (soymilk-producing plant manufactured by Takai Tofu & Soymilk Equipment Co. under the model code of NS2000-S; batchwise steaming can with a stirrer) without being preheated, injected with 50 g of a liquid defoamer (KURETON WIDE LV manufactured by Kao Corporation), heated from soybean soup temperature of 15° C. to a temperature of about 25° C. at a slow temperature elevation speed of 5° C./min for about 2 minutes (first-stage heating), then heated to 80° C. at a rapid temperature elevation speed of about 50° C./min for about 1 minute (second-stage heating), subsequently heated to a temperature of 90° C. at a temperature elevation speed of about 10° C./min for about 1 minute (third-stage heating) and recooked to about 94 to 95° C. at an extremely slow temperature elevation speed of about 1° C./min for about 4 minutes (fourth-stage heating) to complete the heating steps, and immediately separated into soymilk and bean curd refuse with an extracting unit S (manufactured by Takai Tofu & Soymilk Equipment Co. under the product name of Silius). Thus, about 16% brix of soymilk 1 and soymilk 2 each in an amount of about 42 kg were obtained. Each soymilk was immediately chilled to a temperature of 10° C. or less and continuously mixed with liquid bittern ("soft wafer" manufactured by AKO KASEI CO., LTD., containing 13% w/w of magnesium chloride) at a soymilk flow rate of 323 l/h and bittern flow rate of 6.5 l/h using a stationary mixer, and the resultant mixture was sealed in a heat-resistant tofu pack, heated by boiling at 80° C. for 45 minutes and then chilled to prepare packed tofu.

In the heating unit, soymilk 8 (Comparative Example) obtained at 20 rpm of the stirrer attached to the batch unit pattern ordinarily from beginning to end (in a slowly stirred state), soymilk 9 (Example) obtained at 40 rpm (in a rather strongly stirred state having air bubbles entrained therein), with the upper space of the unit pattern always filled with clear air at a temperature in the range of 50 to 70° C., soymilk 10 (Example) obtained at 40 rpm, with the upper space of the unit pattern always filled with blown steam at a temperature in the range of 50 to 70° C., and soymilk 11 (Example) obtained using air-mixed steam having air sucked therein with the steam ejector attached to the steam pipe at 20 rpm (in a slowly stirred state) at a temperature in the range of 50 to 70° C. were compared similarly to Example 1 with respect to the quality of soymilk and tofu. The results thereof are shown in Table 5.

TABLE 4

| Lapse time (min) | Stirred | Not stirred |
|---|---|---|
| 0 | − | − |
| 5 | − | − |
| 10 | ± | − |
| 15 | ± | − |
| 42 | ++ | ± |
| 60 | ++ | + |
| 100 | +++ | ++ |
| 120 | +++ | ++ |

Table 4 shows changes in flavor of a raw soybean soup obtained by the steps of soaking for 14 hours white-eye soybeans produced in 2007 in Canada while flowing well water of 15° C. and subjecting the soaked soybeans to submerged friction grinding using the well water of 15° C. and the submerged friction-grinding unit ("OEC grinder" manufactured by Takai Tofu & Soymilk Equipment Co.). A raw soybean soup was placed in a pack, left standing at room temperature (about 15° C.) and subjected to sensory evaluation. The temperature of the soybean soup was initially 16.5° C. and in 2 hours 14.5° C. Soybean soups stirred and having air entrained therein and those not stirred and left at rest were smelled with respect to a grassy smell and compared and evaluated in smell level. There was no feeling in sensory difference between the soybean soup having air entrained therein and the raw soybean soup having no air entrained therein in 5 minutes in the vicinity of 15° C. In 10 minutes, however, a slight difference could be recognized and, in about 40 minutes, a difference in odor could clearly be induced. Therefore, it was indicated that the raw soybean soup subjected to the submerged friction grinding had no problem on an order for around 30 minutes insofar as it was calmly retained even by being exposed to a slightly high oxygen concentration state and that no great hindrance could be brought about with respect to the tofu quality from a commercial point of view in 15 minutes, preferably around 5 minutes, in a temperature range (in which an enzymatic reaction is slowly made, at 15° C. or less, at 50° C. or more and less than 70° C.) even under a positively oxidizing condition. Incidentally, the commercial point means that the tofu is a product that can fully be understood in flavor difference and distinguished by anyone in comparison with conventional tofu.

TABLE 5

|  | Comp. Ex. Soymilk 8 | Example Soymilk 9 | Example Soymilk 10 | Example Soymilk 11 |
|---|---|---|---|---|
| Soymilk Concentration (% w/w) | 14.2 | 14.1 | 14.0 | 14.1 |
| Soymilk pH | 6.91 | 6.90 | 6.98 | 6.81 |
| Soymilk viscosity (cP) | 1707 | 422 | 1938 | 253 |
| Soymilk SH group corresponding value | 16.6 | 16.4 | 17.1 | 16.0 |
| Soymilk evaluation value | 60 | 50 | 56 | 58 |
| Comments | Sweet aroma without grassy smell, thickly viscous state and refreshing aftertaste | Slight grassy smell, sweet aroma, comparatively thinly viscous state and refreshing aftertaste | Sweet aroma without grassy smell, thickly viscous state and refreshing aftertaste | Slight grassy smell, comparatively thinly viscous state and slightly bitter aftertaste |
| Tofu hardness (gf/cm$^2$) | 42.0 | 52.8 | 37.4 | 65.8 |
| Tofu evaluation points | 65.6 | 63.2 | 47.8 | 71.0 |
| Comments | Too soft and weak eating texture, softness, sweet taste and refreshing aftertaste | Pronounced eating texture, relatively hardness, sweet taste and slightly bitter aftertaste | Too soft and weak eating texture, softness, sweet taste and refreshing aftertaste | Hardness and sweet taste in elastic state, slight grassy smell and bitter aftertaste |

According to Table 5, while soymilk 8 of Comparative Example received a high evaluation as soymilk and tofu produced from it was soft and received a low evaluation, soymilk having been subjected to vigorous stirring in the batch unit pattern (soymilk 9) or soymilk having had steam containing a proper amount of water blown in the soybean soup (soymilk 11) had a slightly bitter taste, a smooth sensation as if it went down one's throat, a sweet taste and entailed no difficulty in being commercialized, and tofu produced from it had a rich and sweet flavor, was hard and had a good eating texture and, therefore, received a high evaluation as a whole. In addition, soymilk having had saturated steam blown in the upper space of the batch unit pattern even in a temperature zone high in oxidase activity (soymilk 10) had substantially the same refreshing aftertaste as soymilk 8 and exhibited a low degree of protein oxidation (high SH group corresponding value), and tofu produced from it similarly had a too soft and weak eating texture and received a low evaluation. Thus, it was clarified that the physicality of tofu could be enhanced through the provision of the oxidizing condition during heating, particularly at the temperature in the range of 50 to 70° C., the formation of a favorite sweet aroma in the range of not giving any hindrance to a flavor and the induction of protein oxidation, i.e. the formation of S—S bonds.

The present invention is not limited to the aforementioned embodiments. Though the stirring and mixing unit K1 is here disposed between the preheating unit Y1 and the heating unit N, stirring and mixing units K1 may be disposed backward and forward of the preheating unit Y1. It goes without saying that the present invention may appropriately be modified without departing from its gist and scope.

Figure 1:
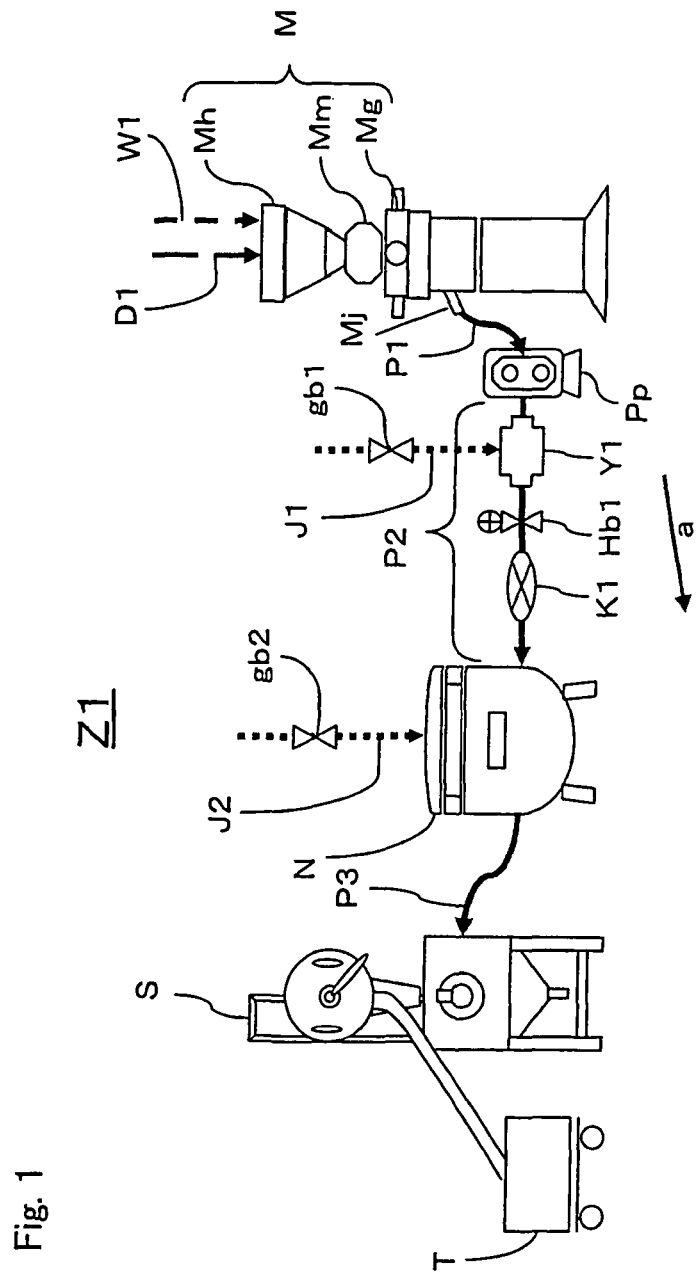
FIG. 1 is a schematic view illustrating a conventional process and apparatus for producing soymilk.
Figure 2:
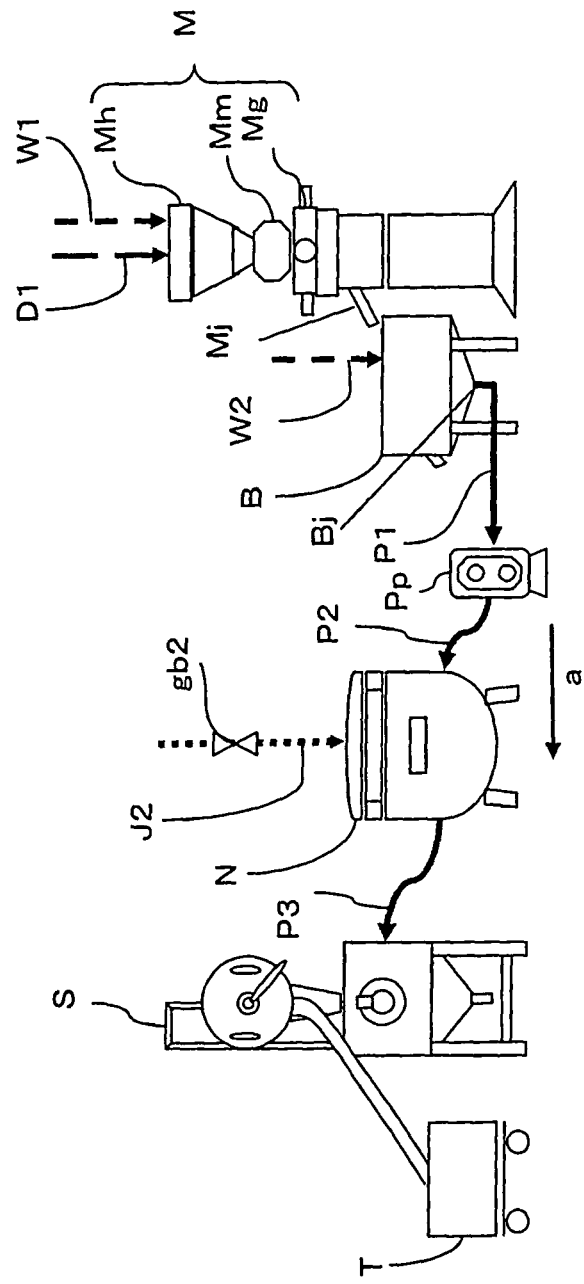
FIG. 2 is a schematic view illustrating a process and apparatus for producing soymilk according to one embodiment of the present invention.
Figure 3:
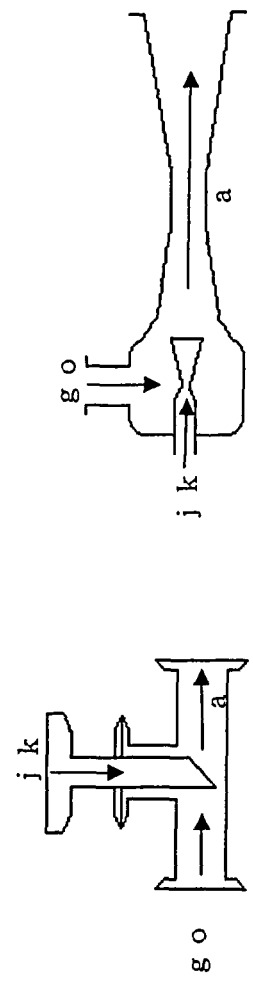
FIG. 3 is a schematic view illustrating a preheating unit according to one embodiment of the present invention.
Figure 4:
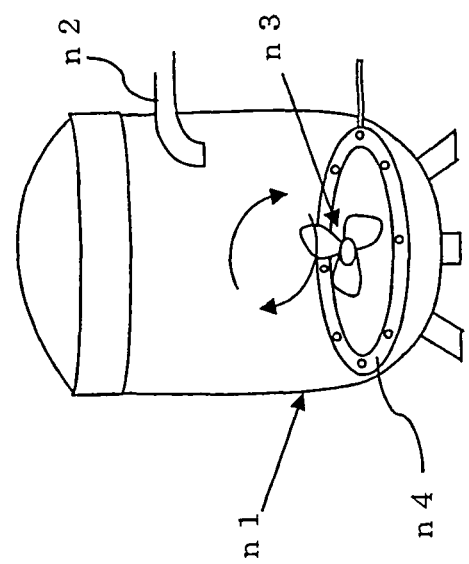
FIG. 4 is a schematic view illustrating a heating unit according to one embodiment of the present invention.
Figure 5:
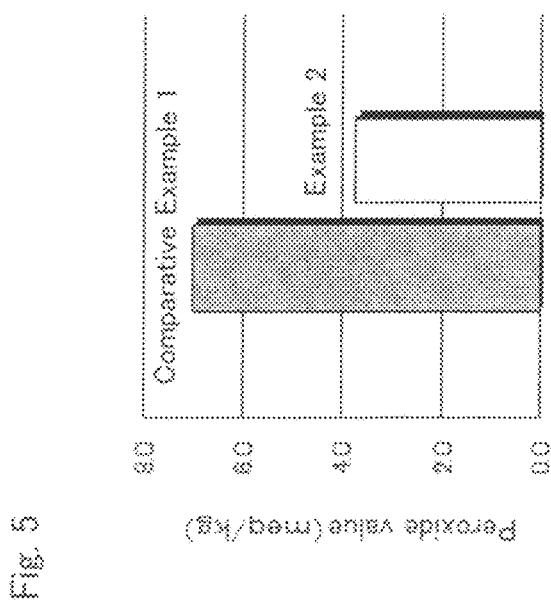
FIG. 5 is a diagram showing the results of analyzing peroxide values in a producing process according to one embodiment of the present invention and a conventional producing process.
Figure 6:
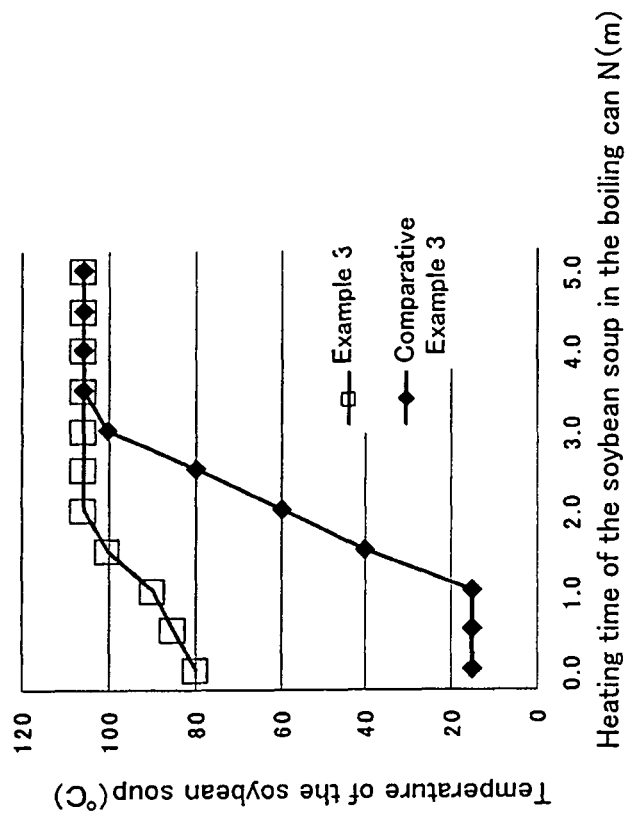
FIG. 6 is a diagram showing temperature rise curves in a producing process according to one embodiment of the present invention and a conventional producing process.
Figure 7:
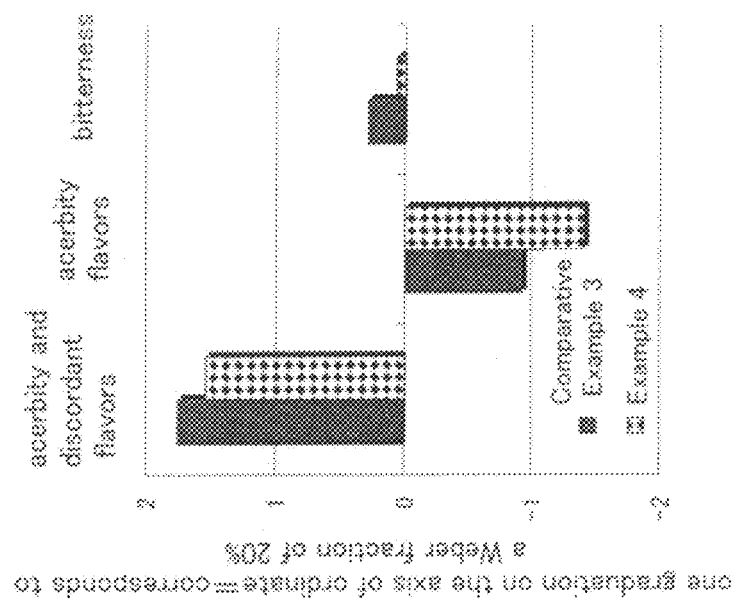
FIG. 7 is a diagram showing the results of analyzing senses of taste a producing process according to one embodiment of the present invention and a conventional producing process.
Figure 8:
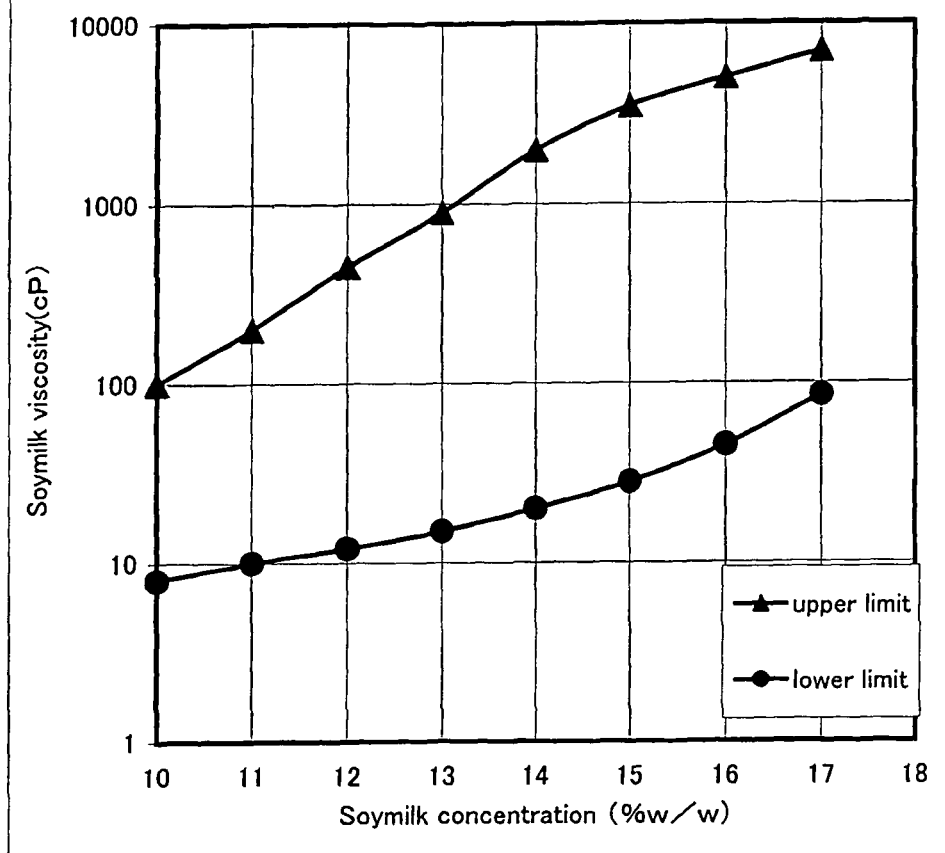
FIG. 8 is a graph showing the relation between soymilk concentration and soymilk viscosity.
Figure 9:
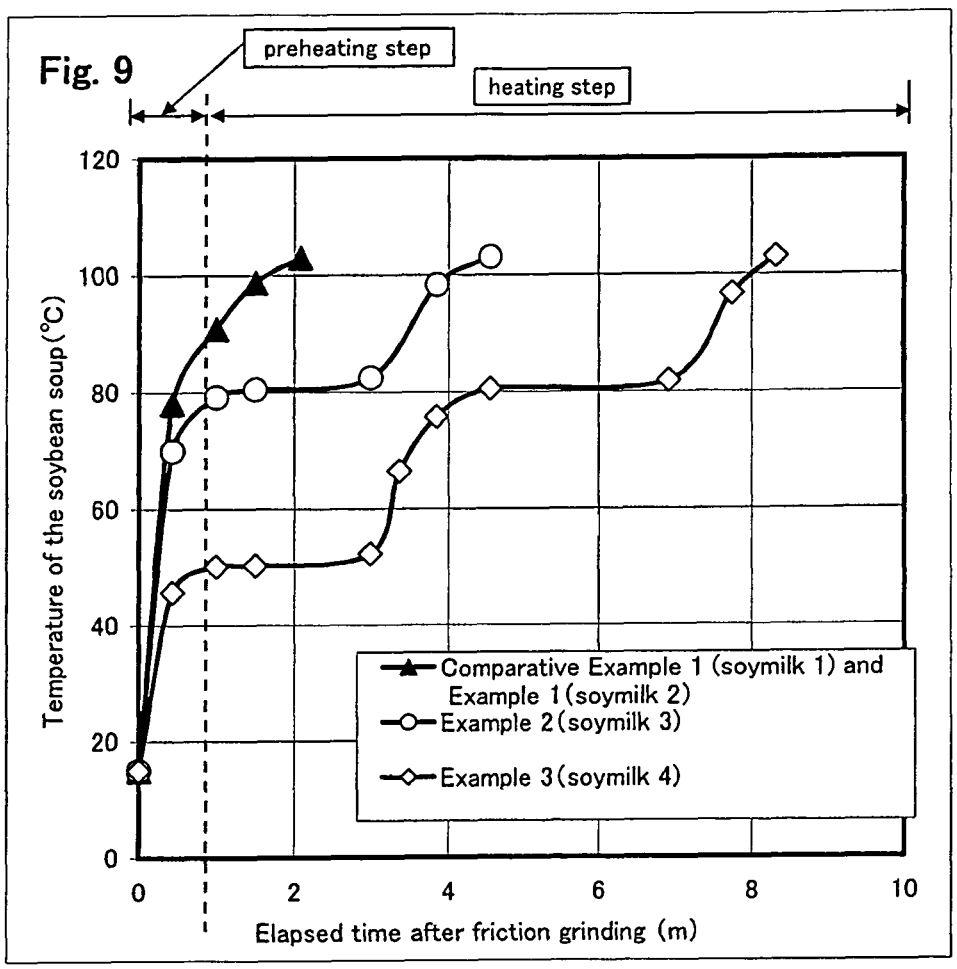
FIG. 9 is a graph showing the relation between the heating time of raw soybean soups and the temperature of soybean soups.
Figure 10:
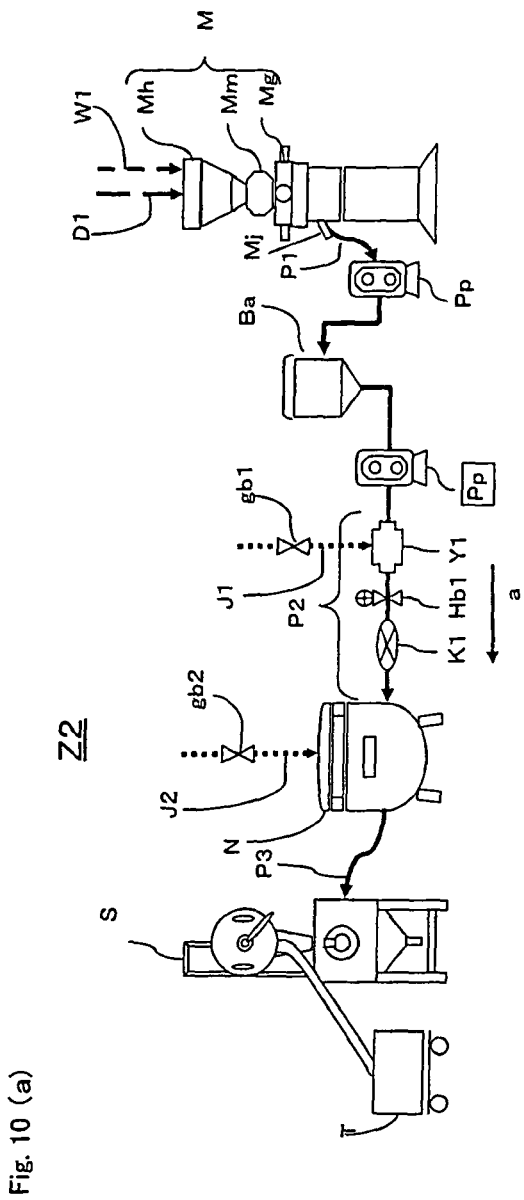
FIG. 10 is a diagram illustrating examples according to one embodiment of the present invention, in which a retaining step is provided between a submerged friction-grinding step and the heating step.
Figure 10:
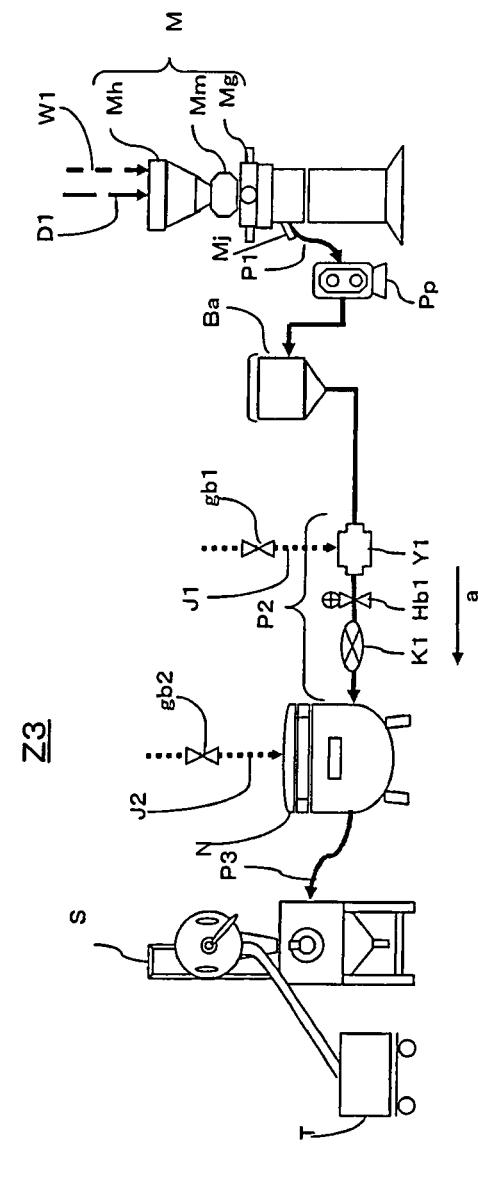
Figure 11:
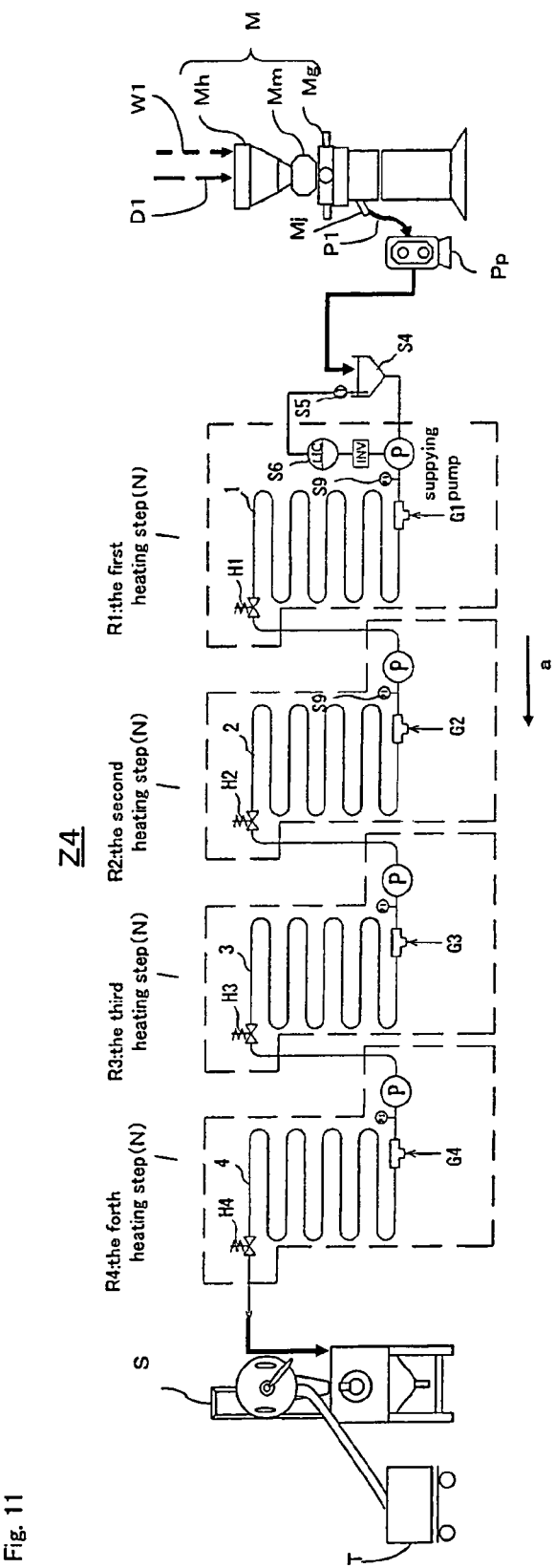
FIG. 11 is a diagram illustrating an example according to one embodiment of the present invention, in which a retaining step is provided between a submerged friction-grinding step and the heating step.
Figure 12:
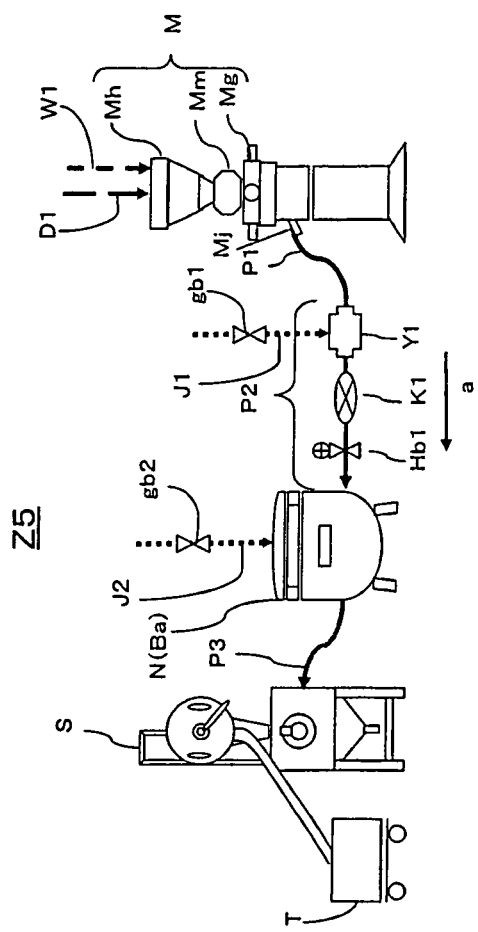
FIG. 12 is a diagram illustrating an example according to one embodiment of the present invention, in which a retaining step is provided between a submerged friction-grinding step and the heating step.
Figure 13:
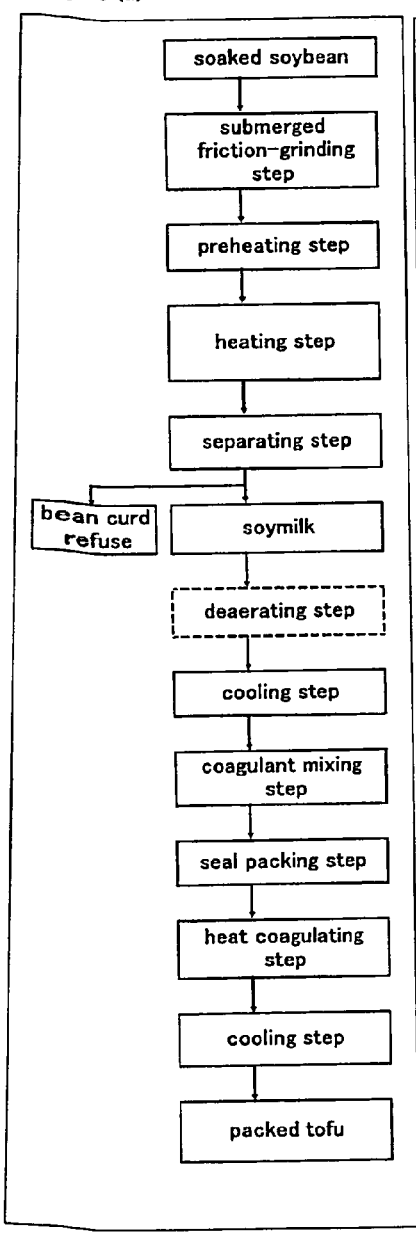
FIG. 13 contains process charts each showing the flow (flow) of a soymilk-producing process according to one embodiment of the present invention.
Figure 13:
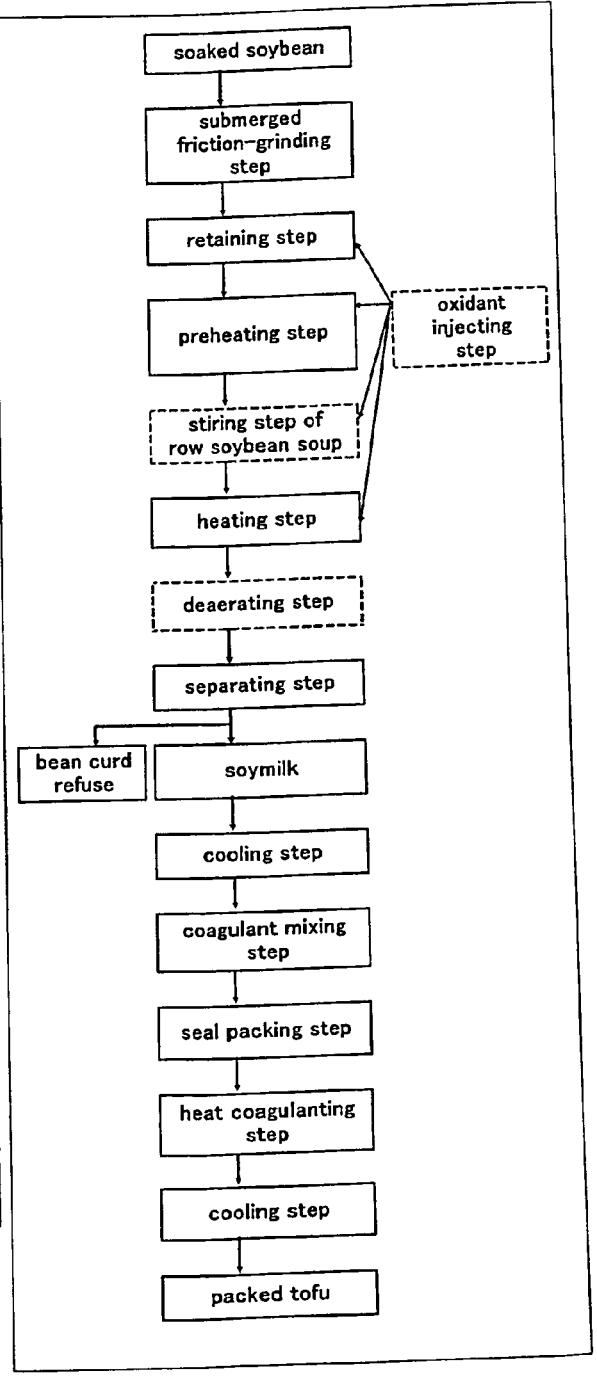
Figure 13:
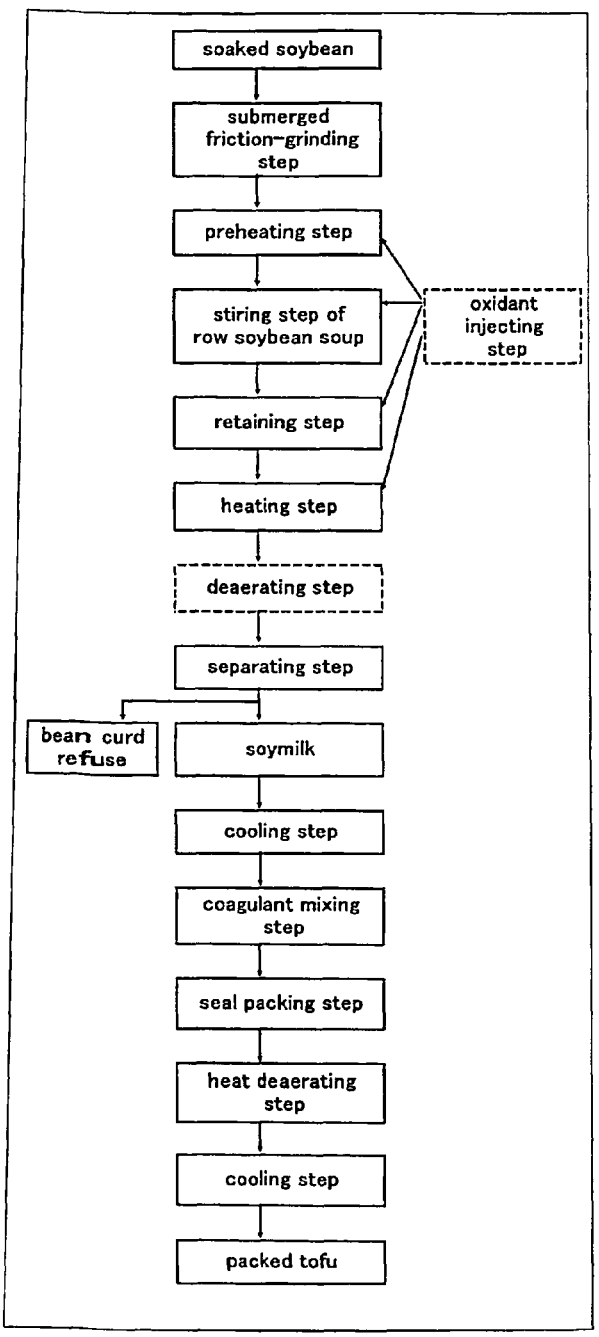
Figure 13:
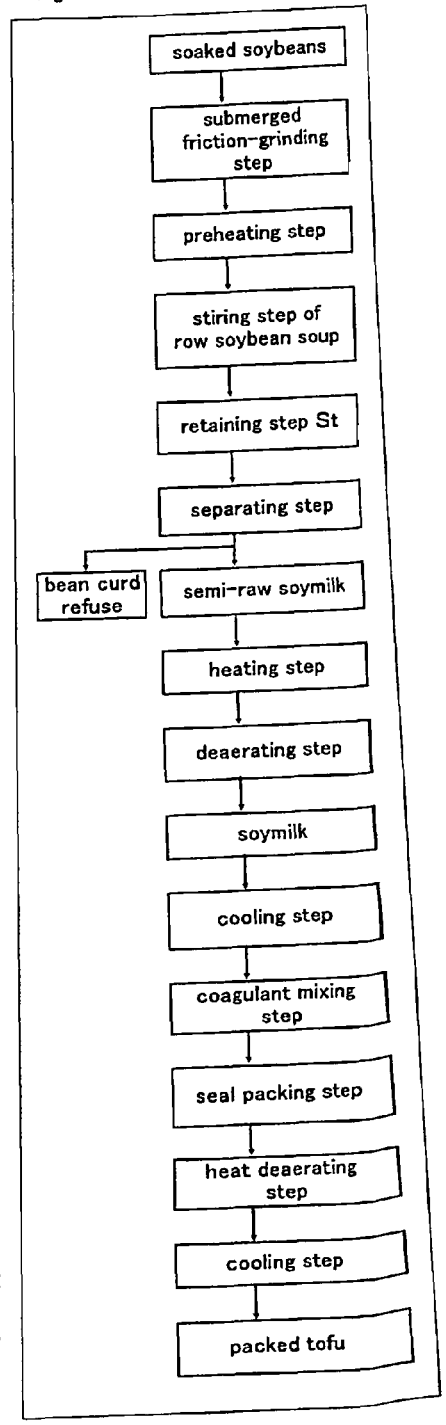
Figure 13:
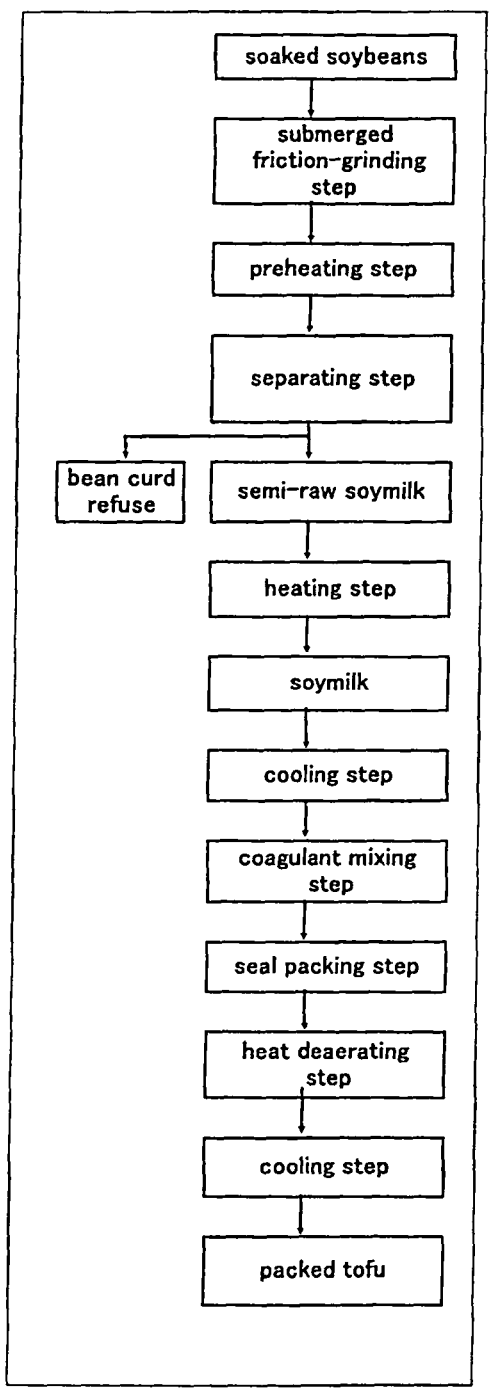

The invention claimed is:
1. A method for producing soymilk, comprising:
a submerged friction-grinding step of grinding down soybeans while keeping the soybeans immersed under soybean-grinding water in an air-tight friction-grinding portion of a submerged friction-grinding unit to obtain a raw soybean soup having a specific gravity of 1.00-1.10;

a retaining step retaining the raw soybean soup at 15° C. or lower, or for 5 minutes or less thereby obtaining a retained soybean soup;

a preheating step of preheating the retained soybean soup at a temperature of 60-80° C. within 0.1-60 seconds thereby obtaining a soybean soup; and a heating step of further heating the soybean soup at a temperature same as or higher than the temperature in the preheating step in a continuous heating unit or a batchwise boiling can;

wherein the preheating step and the heating step are airtightly connected therebetween.

2. A method for producing soymilk according to claim 1, wherein the retained soybean soup is heated at the preheating step by a steam supplied to a connecting pipe that connects the submerged friction-grinding step and the heating step.

3. A method for producing soymilk according to claim 1, wherein the retained soybean soup is heated or retained at the preheating step at a temperature of 60° C. or more and less than 70° C. for a predetermined period of time while controlling contact of the retained soybean soup with air.

4. A method for producing soymilk according to claim 1, wherein the preheating step includes a rapid heating step in which an average temperature elevation rate at the temperature is 0.2 to 100° C./min.

5. A method for producing soymilk according to claim 1, wherein the preheating step further includes retaining the retained soybean soup at the temperature for an additional period of 1 to 3600 sec after preheating the retained soybean soup at the temperature within 0.1-60 seconds.

6. A method for producing soymilk according to claim 1, wherein the soybean soup is heated or retained at the heating step at a temperature of 80° C. or more and less than 100° C. for a prescribed period of time.

7. A method for producing soymilk according to claim 1, wherein the soybean soup is heated or retained in a sealed state at the heating step at a temperature of 100° C. or more and up to 180° C. for a prescribed period of time.

8. A method for producing soymilk according to claim 1, wherein the soybean soup is heated or retained at the heating step for a period of 0.1 to 3600 sec.

9. A method for producing soymilk according to claim 1, wherein the retaining step further includes contacting the raw soybean soup with air or supplying an oxidant to the raw soybean soup.

10. A method for producing soymilk from the soymilk obtained from the soybean soup according to claim 1, wherein the produced soymilk has a soybean solid content concentration of 10 to 17% w/w, a pH of 6.5 to 7.5 and a viscosity of 2,000 mPa·s or less in a state being chilled to 20° C. or less.

11. A method for producing soymilk according to claim 1, further comprising feeding high-temperature steam thereby suppressing a contact of the retained soybean soup and the soybean soup with air in the preheating step and the heating step.

12. A method for producing soymilk according to claim 1, further comprising a post-preheating step of maintaining a temperature of the soybean soup at 60° C. or higher until the heating step begins.

13. A method for producing soymilk according to claim 12, further comprising an agitating step of agitating the soybean soup until the heating step begins.

* * * * *